US012769242B2

(12) United States Patent
Sato

(10) Patent No.: US 12,769,242 B2
(45) Date of Patent: Oct. 20, 2026

(54) IMAGE FORMING APPARATUS

(71) Applicant: CANON KABUSHIKI KAISHA, Tokyo (JP)

(72) Inventor: Kengo Sato, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/332,476

(22) Filed: Sep. 18, 2025

(65) Prior Publication Data

US 2026/0086490 A1 Mar. 26, 2026

(30) Foreign Application Priority Data

Sep. 20, 2024 (JP) ................................ 2024-163546

(51) Int. Cl.
*G03G 15/00* (2006.01)

(52) U.S. Cl.
CPC ..... *G03G 15/6576* (2013.01); *G03G 15/6579* (2013.01); *G03G 2215/00662* (2013.01)

(58) Field of Classification Search
CPC ........... G03G 15/6576; G03G 15/6579; G03G 2215/00662
See application file for complete search history.

(56) References Cited

U.S. PATENT DOCUMENTS

2006/0245795 A1* 11/2006 Kamiyama ........ G03G 15/6576 399/322
2020/0363764 A1* 11/2020 Inoue ................. G03G 15/6576
2024/0134307 A1* 4/2024 Ishioka .............. G03G 15/6576

FOREIGN PATENT DOCUMENTS

JP H09249345 A 9/1997
JP 2000191211 A 7/2000

* cited by examiner

*Primary Examiner* — Sandra Brase
(74) *Attorney, Agent, or Firm* — ROSSI, KIMMS & McDOWELL LLP

(57) ABSTRACT

An image forming apparatus includes an image forming portion, a discharge conveying path to convey a sheet on which an image is formed by the image forming portion toward a discharging portion, and a reconveying path branched from the discharge conveying path and to reconvey the sheet of which the image is formed on a first surface to the image forming portion. A curl correcting portion is disposed in the reconveying path, includes first and rotatable members to form a nip, and corrects a curl of the sheet by conveying the sheet while the first rotatable member deforms the second rotatable member in the nip. An oblique movement correcting portion is disposed in the reconveying path and upstream of the curl correcting portion with respect to a sheet conveying direction and performs an oblique movement correction of the sheet.

20 Claims, 17 Drawing Sheets

(a)

(b)

| | LOW HUMIDITY ENVIRONMENT | | | HIGH HUMIDITY ENVIRONMENT | | |
|---|---|---|---|---|---|---|
| | LOW DENSITY | MIDDLE DENSITY | HIGH DENSITY | LOW DENSITY | MIDDLE DENSITY | HIGH DENSITY |
| ULTRATHIN PAPER | 2 | 0 | −3 | +5 | −2 | −7 |
| THIN PAPER | 1 | 0 | −2 | +3 | −1 | −5 |
| PLAIN PAPER | 0 | 0 | −1 | +2 | 0 | −3 |
| THICK PAPER | 0 | 0 | 0 | +1 | 0 | −1 |

FIG. 14

IMAGE FORMING APPARATUS

BACKGROUND

Field of the Technology

The present disclosure relates to an image forming apparatus which forms an image on a sheet.

Description of the Related Art

For example, in order to straighten a curl of a sheet, a curling device which curls the sheet in an opposite direction of the curl of the sheet is proposed (see Japanese Laid-Open Patent Application (JP-A) Hei 9-249345). The curling device which is disclosed in JP-A Hei 9-249345 is configured so that a first roller and a second roller with a higher hardness than the first roller are pressed each other, and curling is performed by conveying a sheet in a nip which is formed by those rollers. Further, when image forming is performed on a sheet, the sheet is likely to be curled. Therefore, in JP-A Hei 9-249345, the curling device is disposed so as to curl the sheet which will be stacked in an intermediary tray, in the image forming apparatus which stacks the sheet in which image forming for a first time is completed in the intermediary tray and conveys the sheet from the intermediary tray to a transfer charging device again.

SUMMARY

By the way, as described above, in a device which curls the sheet which is curled (that is, corrects curl), the sheet is nipped and conveyed by a nip which is formed between a roller which is formed of an elastic member and a roller which is pressed so as to intrude it. However, in such a structure, especially when attempting to curl the sheet strongly, since a restraining force of the sheet by the nip becomes strong, when there is a difference in speeds which are applied in a conveying direction to the sheet at different positions with respect to a width direction, a problem may be occurred that wrinkle is easily generated in the sheet.

In response to the above issue, it is an object of the present disclosure to provide an image forming apparatus capable of preventing wrinkles from generating on the sheet when correcting the curl of the sheet in a curl correcting portion.

According to an aspect of the disclosure, there is provided an image forming apparatus comprising: an image forming portion configured to form an image on a sheet; a discharge conveying path configured to convey the sheet on which the image is formed by the image forming portion toward a discharging portion to which the sheet is discharged; a reconveying path branched from the discharge conveying path and configured to reconvey the sheet of which the image is formed on a first surface by the image forming portion to the image forming portion; a curl correcting portion disposed in the reconveying path, including a first rotatable member and a second rotatable member configured to form a first nip portion with the first rotatable member, and configured to correct a curl of the sheet by conveying the sheet while the first rotatable member deforms the second rotatable member in the first nip portion; and a first oblique movement correcting portion disposed in the reconveying path and upstream of the curl correcting portion with respect to a sheet conveying direction and configured to be capable of performing an oblique movement correction of the sheet.

Features of the present disclosure will become apparent from the following description of embodiments with reference to the attached drawings. The following description of embodiments is described by way of example.

Figure 3:
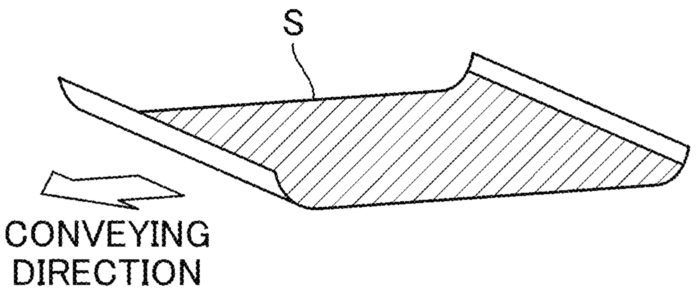
Figure 3:
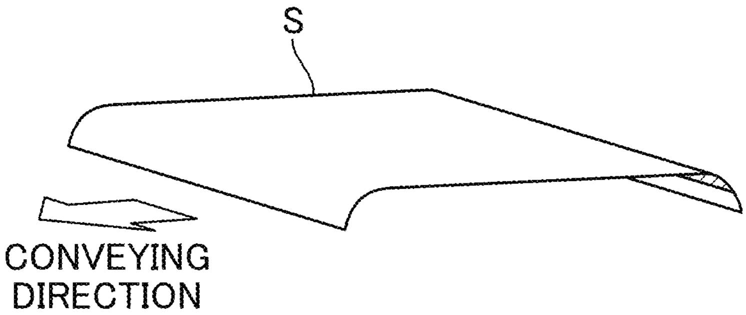

Part (a) of FIG. 3 is a perspective view showing a sheet in which its surface is curled in a concave shape.

Part (b) of FIG. 3 is a perspective view showing a sheet in which its surface is curled in a convex shape.

Figure 4:
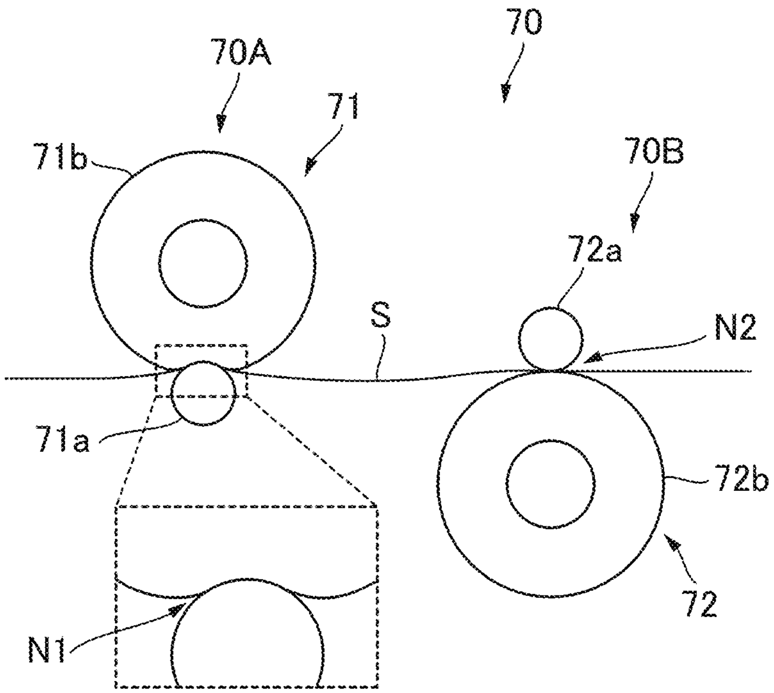

FIG. 4 is a schematic view showing a double-sided decurling unit according to the first embodiment.

Figure 5:
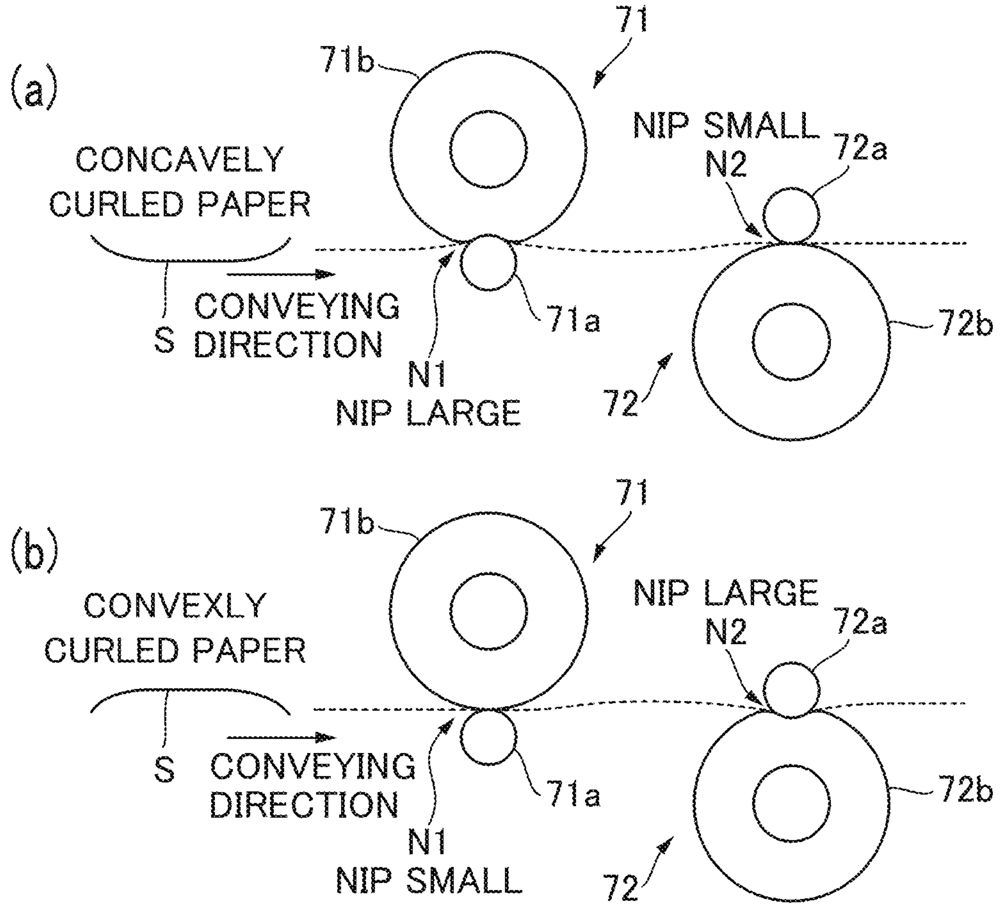

Part (a) of FIG. 5 is a schematic view showing a state that the sheet which is curled in the concave shape is decurled by the double-sided decurling unit.

Part (b) of FIG. 5 is a schematic view showing a state that the sheet which is curled in the convex shape is decurled by the double-sided decurling unit.

Figure 6:
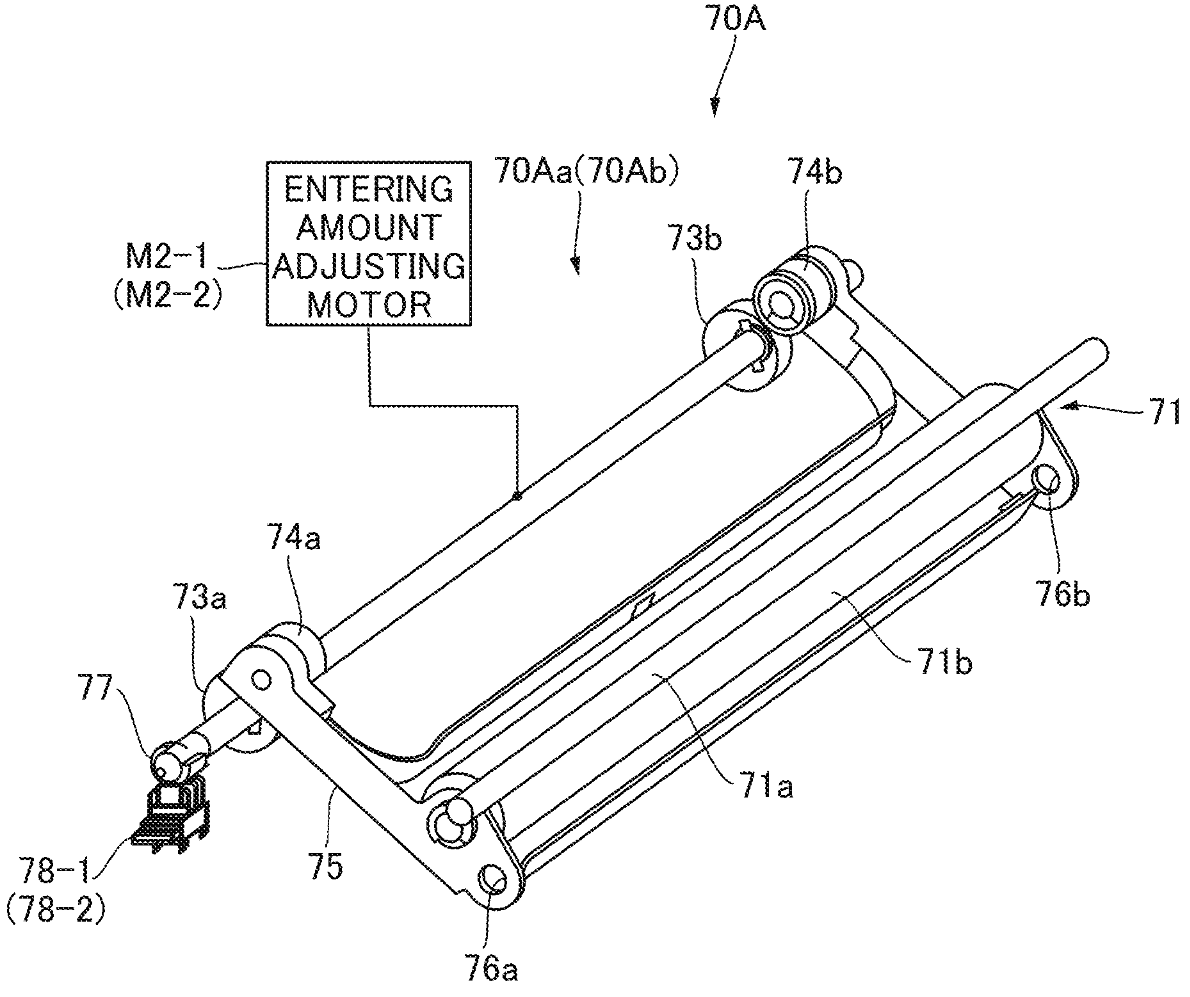

FIG. 6 is a perspective view showing an invading (entering) amount adjusting mechanism of an upstream curl correcting roller pair.

Figure 7:
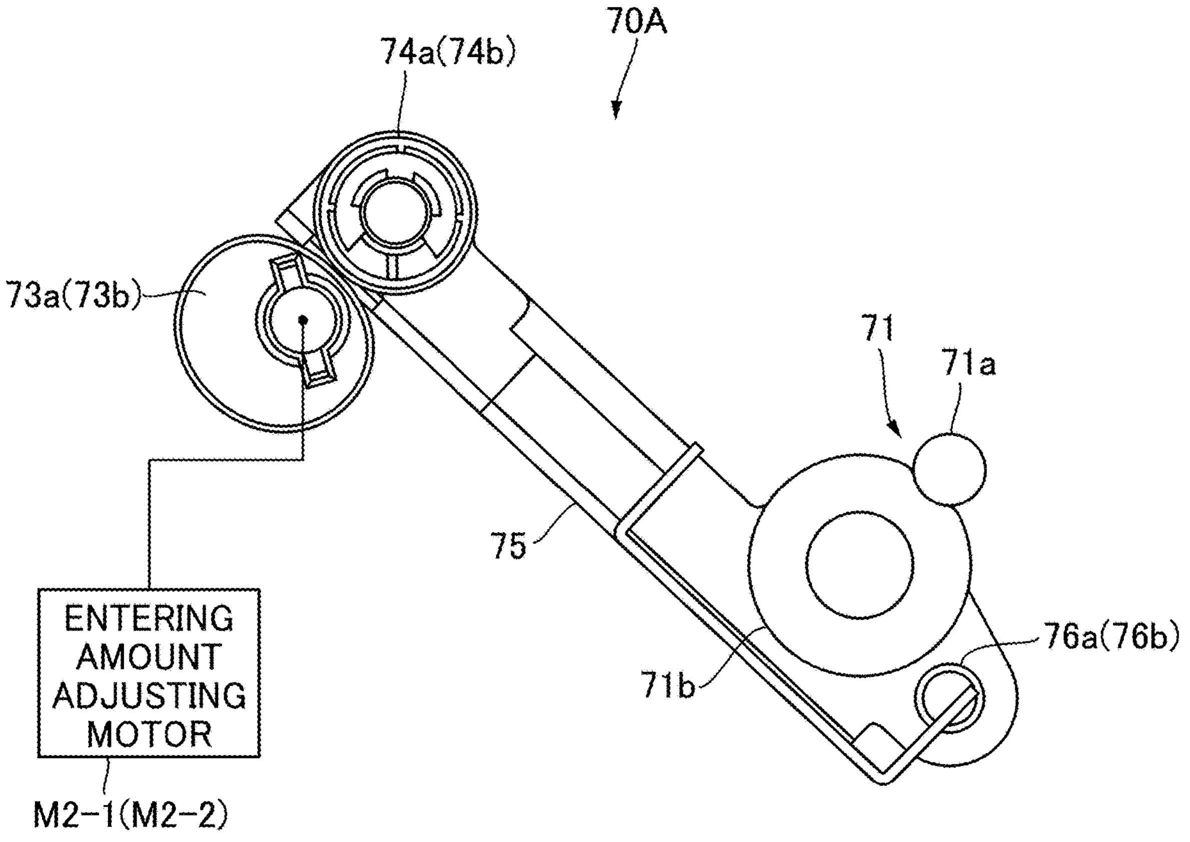

FIG. 7 is a schematic view showing a state that an invading amount is small in the invading amount adjusting mechanism of the upstream curl correcting roller pair.

Figure 8:
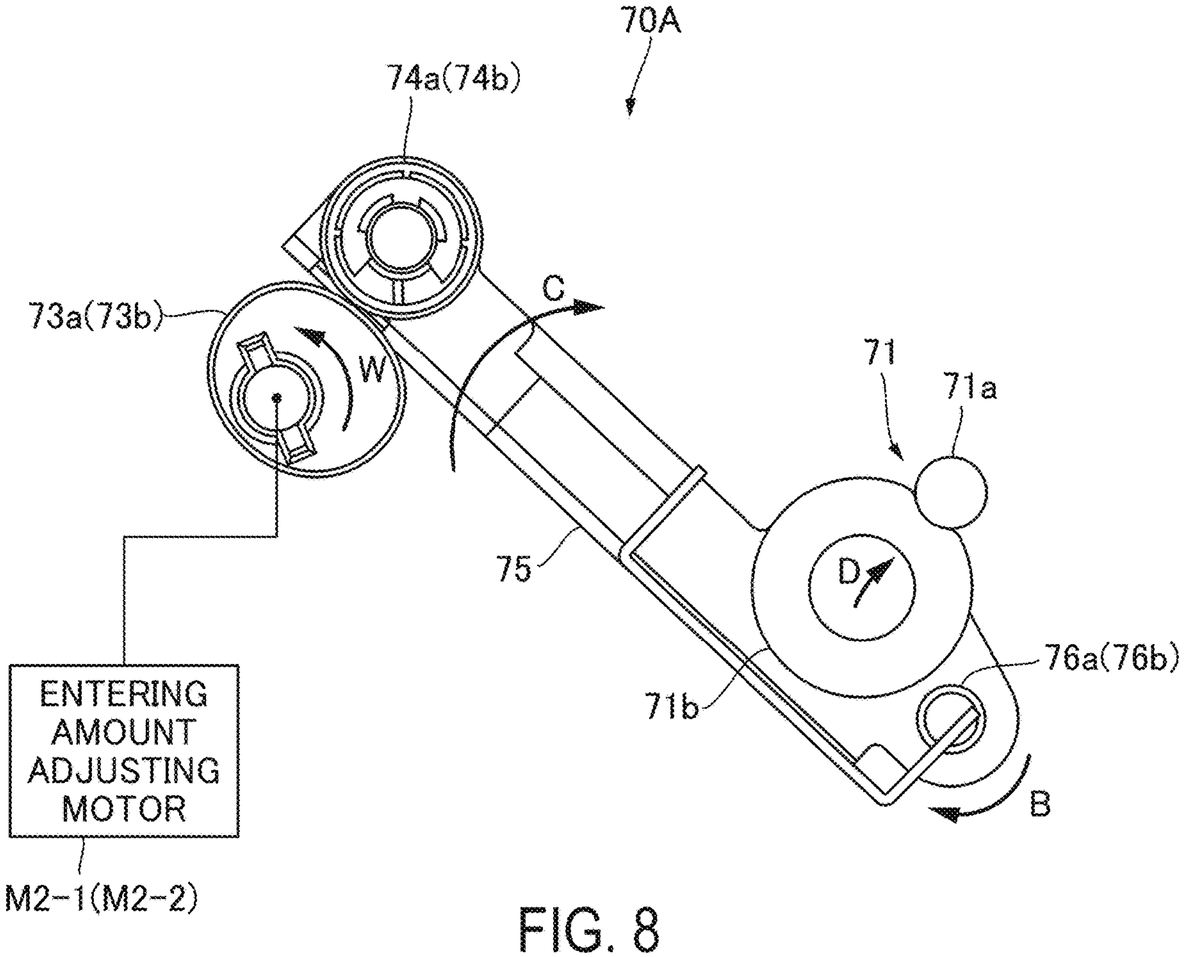

FIG. 8 is a schematic view showing a state that the invading amount is large in the invading amount adjusting mechanism of the upstream curl correcting roller pair.

Figure 9:
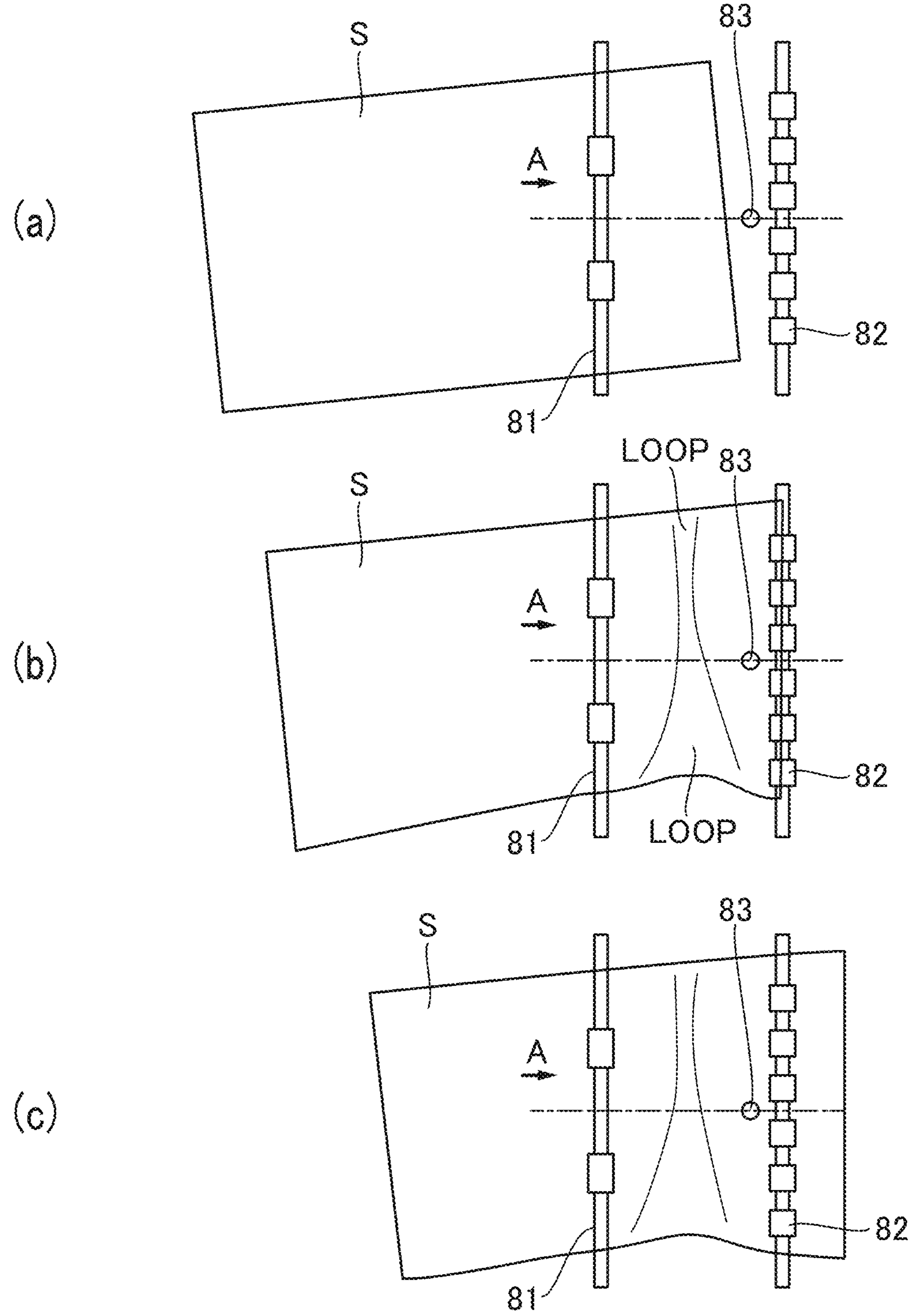

Part (a) of FIG. 9 is a view showing a state that the sheet has been conveyed to a double-sided pre-registration roller pair in a double-sided oblique movement correcting unit.

Part (b) of FIG. 9 is a view showing a state that the sheet has been conveyed to a double-sided registration roller pair in the double-sided oblique movement correcting unit.

Part (c) of FIG. 9 is a view showing a state that the sheet is started to be conveyed from the double-sided registration roller pair toward a downstream side in the double-sided oblique movement correcting unit.

Figure 10:
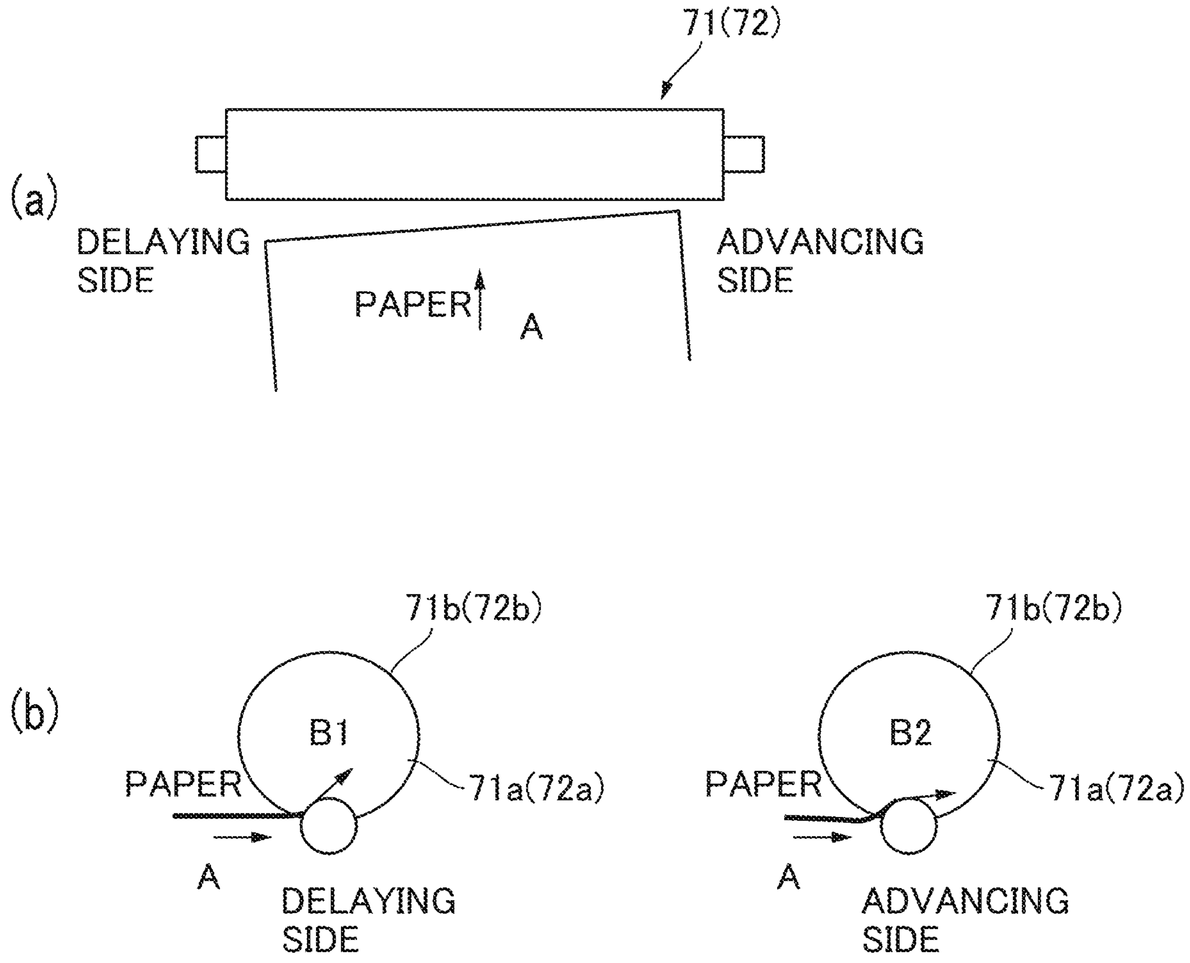

Part (a) of FIG. 10 is a top view showing a state that the sheet is obliquely conveyed to the upstream curl correcting roller pair.

Part (b) of FIG. 10 is a schematic sectional view showing a difference of a velocity vector which is occurred between a receding side and an advancing side with respect to a width direction of the sheet.

Figure 11:
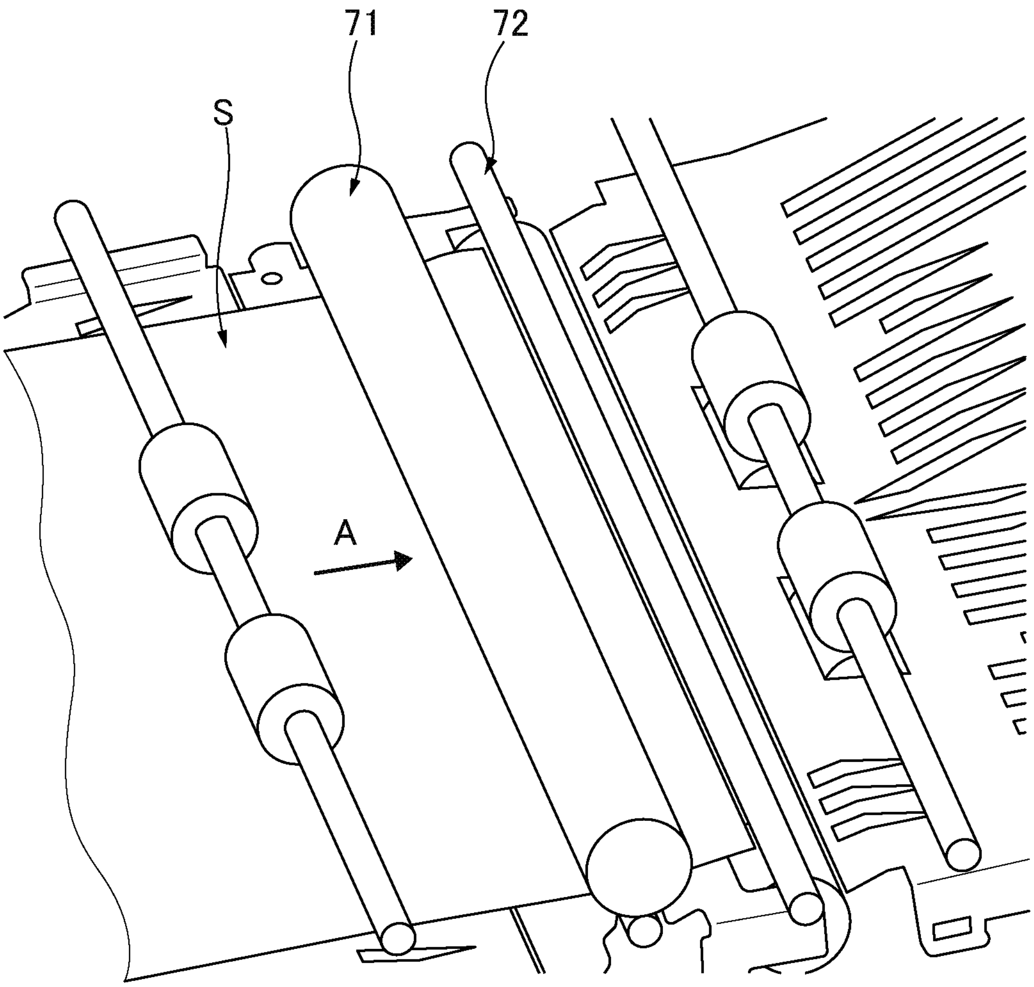

FIG. 11 is a view showing a three dimensional simulation image in a case that the obliquely moving sheet is conveyed to the double-sided decurling unit.

Figure 12:
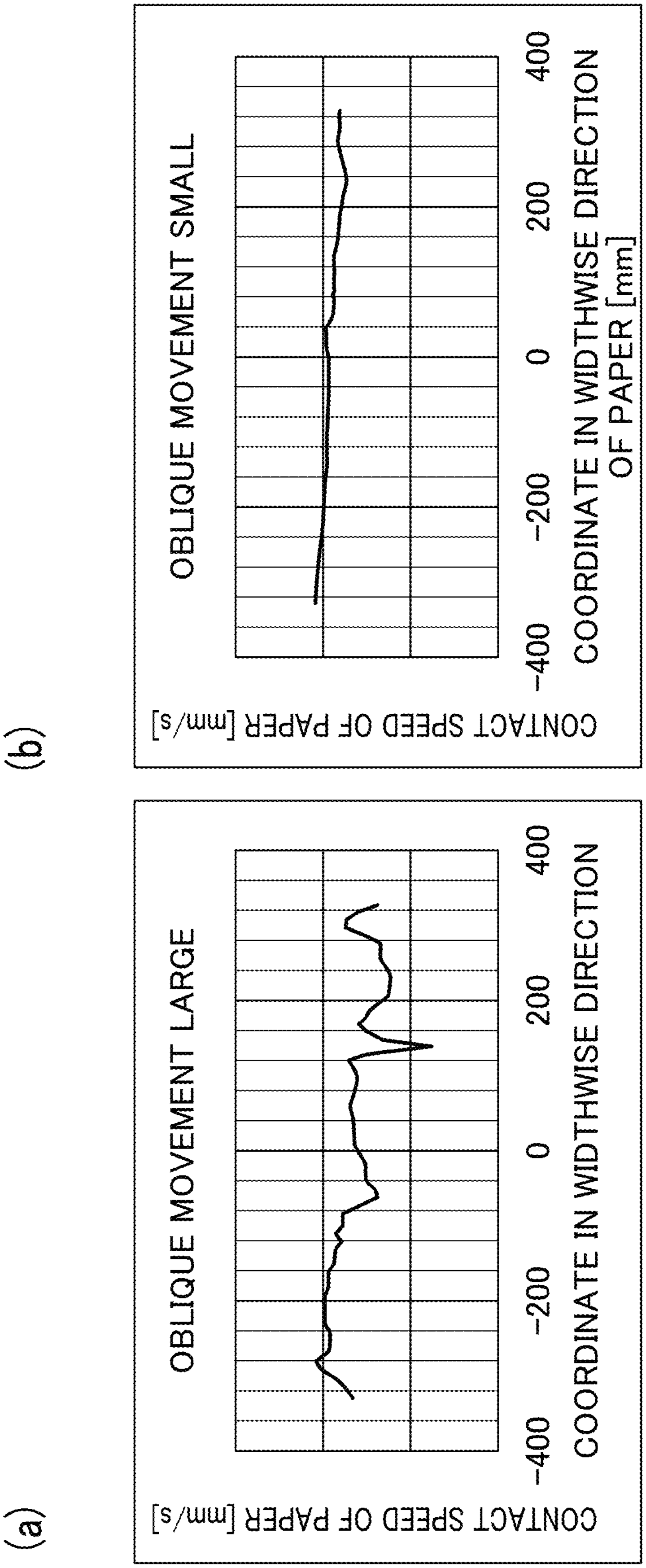

Part (a) of FIG. 12 is a graph showing a result of the three dimensional simulation in a case that the sheet whose oblique amount is large is conveyed to the double-sided decurling unit.

Part (b) of FIG. 12 is a graph showing a result of the three dimensional simulation in a case that the sheet whose oblique amount is small is conveyed to the double-sided decurling unit.

Figure 13:
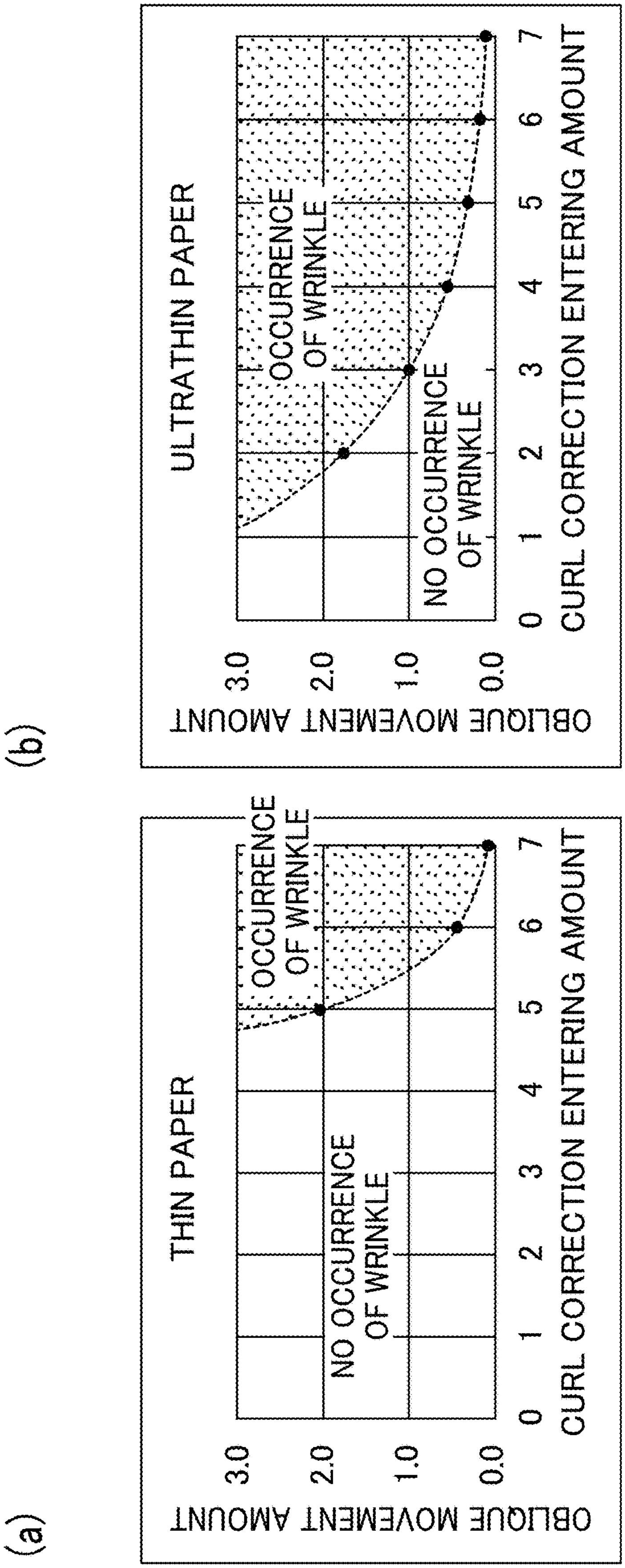

Part (a) of FIG. 13 is a graph showing a relationship among an oblique amount, an amount of curl correcting invasion, and wrinkle generation in a case that a sheet type is thin paper.

Part (b) of FIG. 13 is a graph showing a relationship among an oblique amount, an amount of curl correcting invasion, and wrinkle generation in a case that a sheet type is ultrathin paper.

FIG. 14 is a curl correction table which records a relationship of an amount of curl correcting invasion with respect to a sheet type, an environmental humidity, and an image density.

Figure 15:
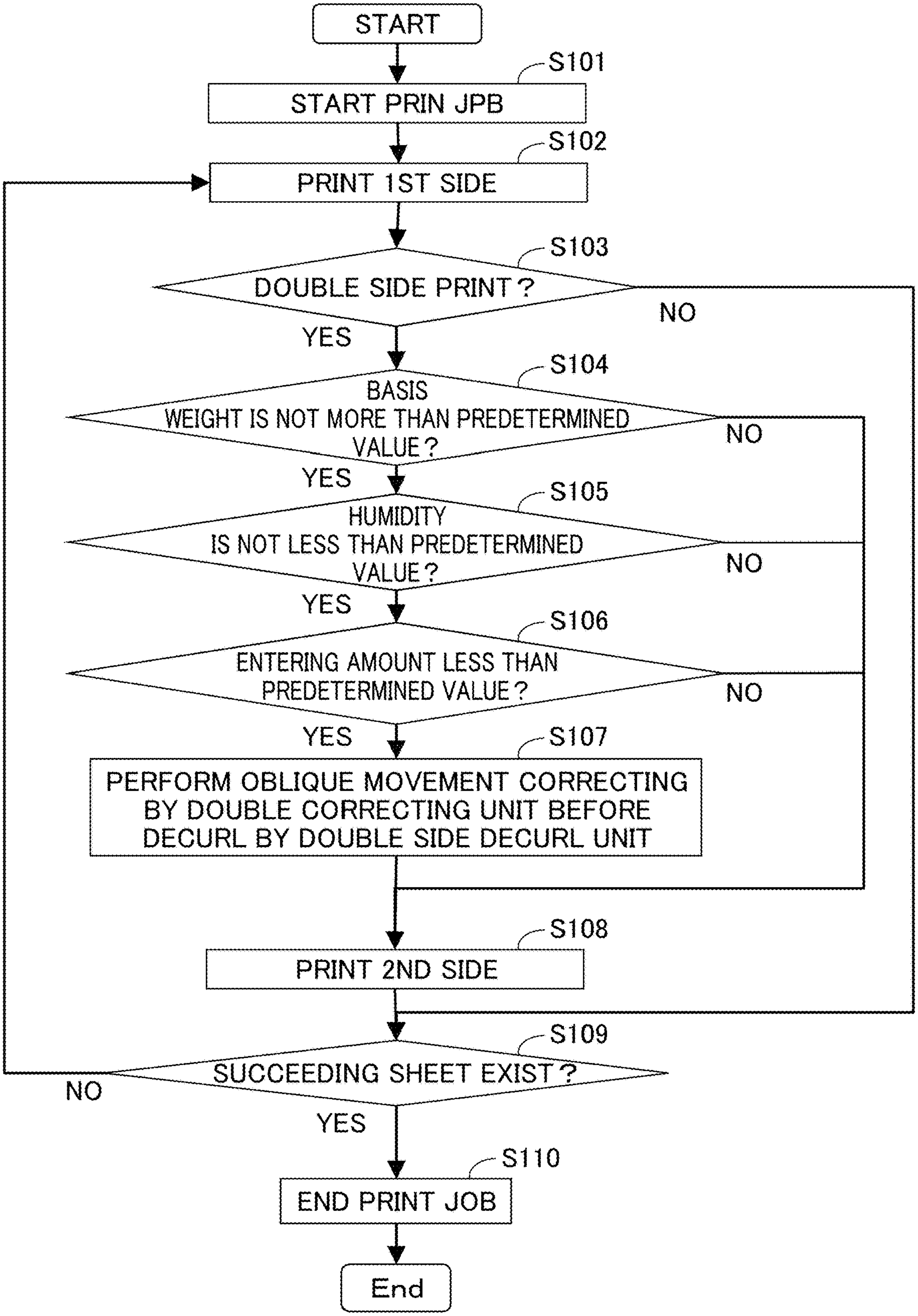

FIG. 15 is a flow chart showing a control of the double-sided oblique movement correcting unit.

Figure 16:
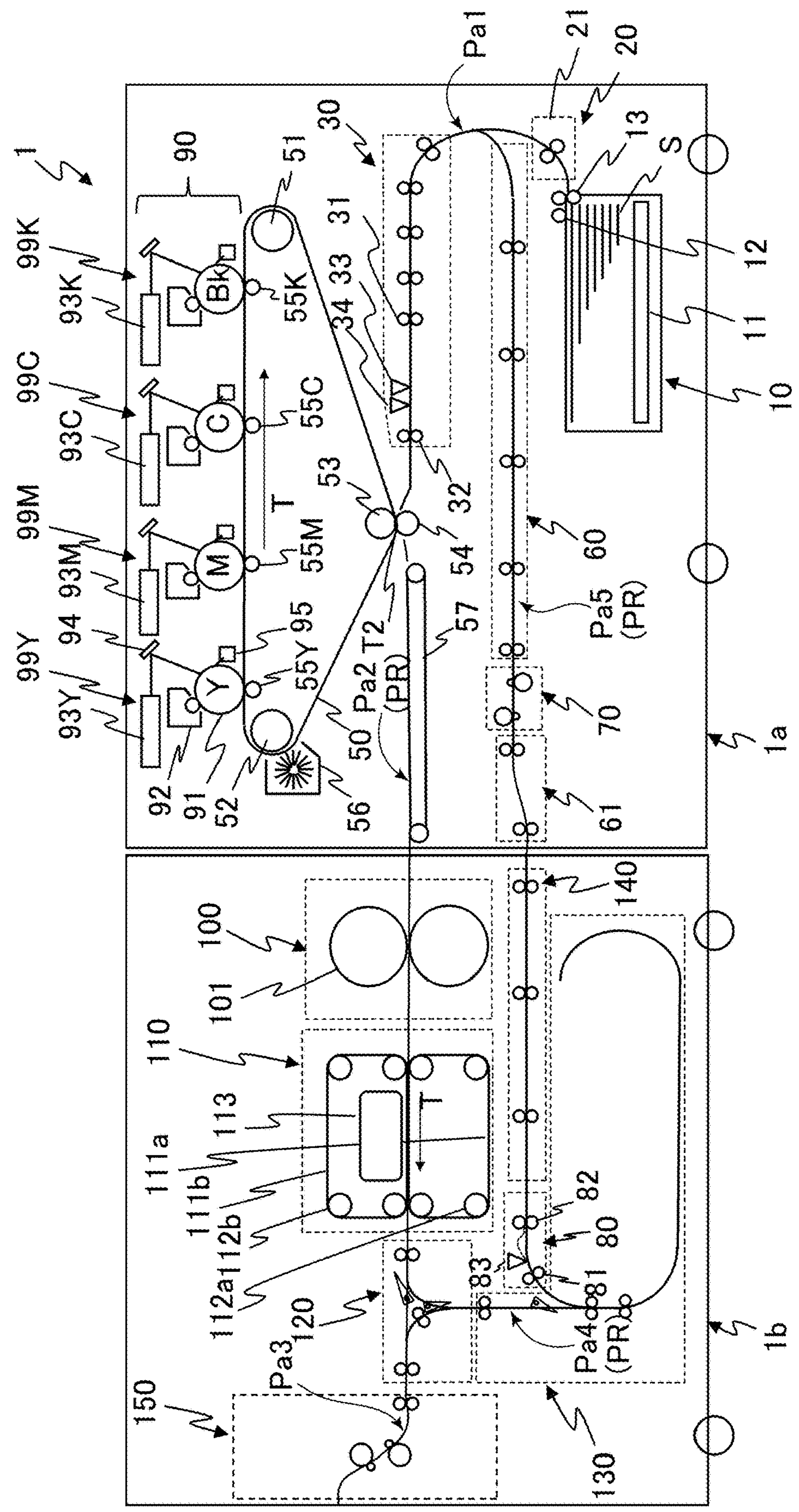

FIG. 16 is a schematic view showing a printer according to a second embodiment.

Figure 17:
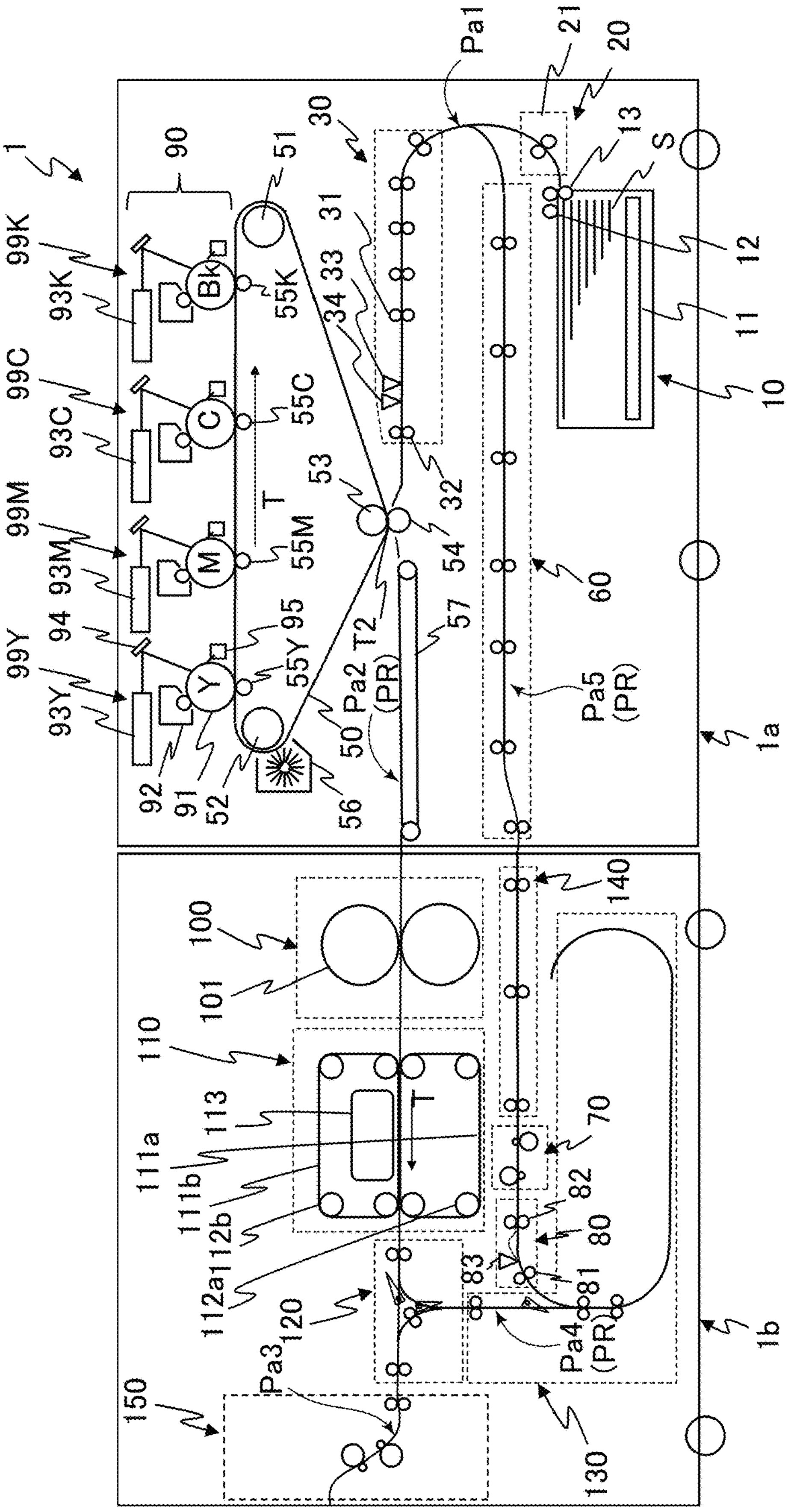

FIG. 17 is a schematic view showing a printer according to a third embodiment.

DESCRIPTION OF THE EMBODIMENTS

First Embodiment

Figure 1:
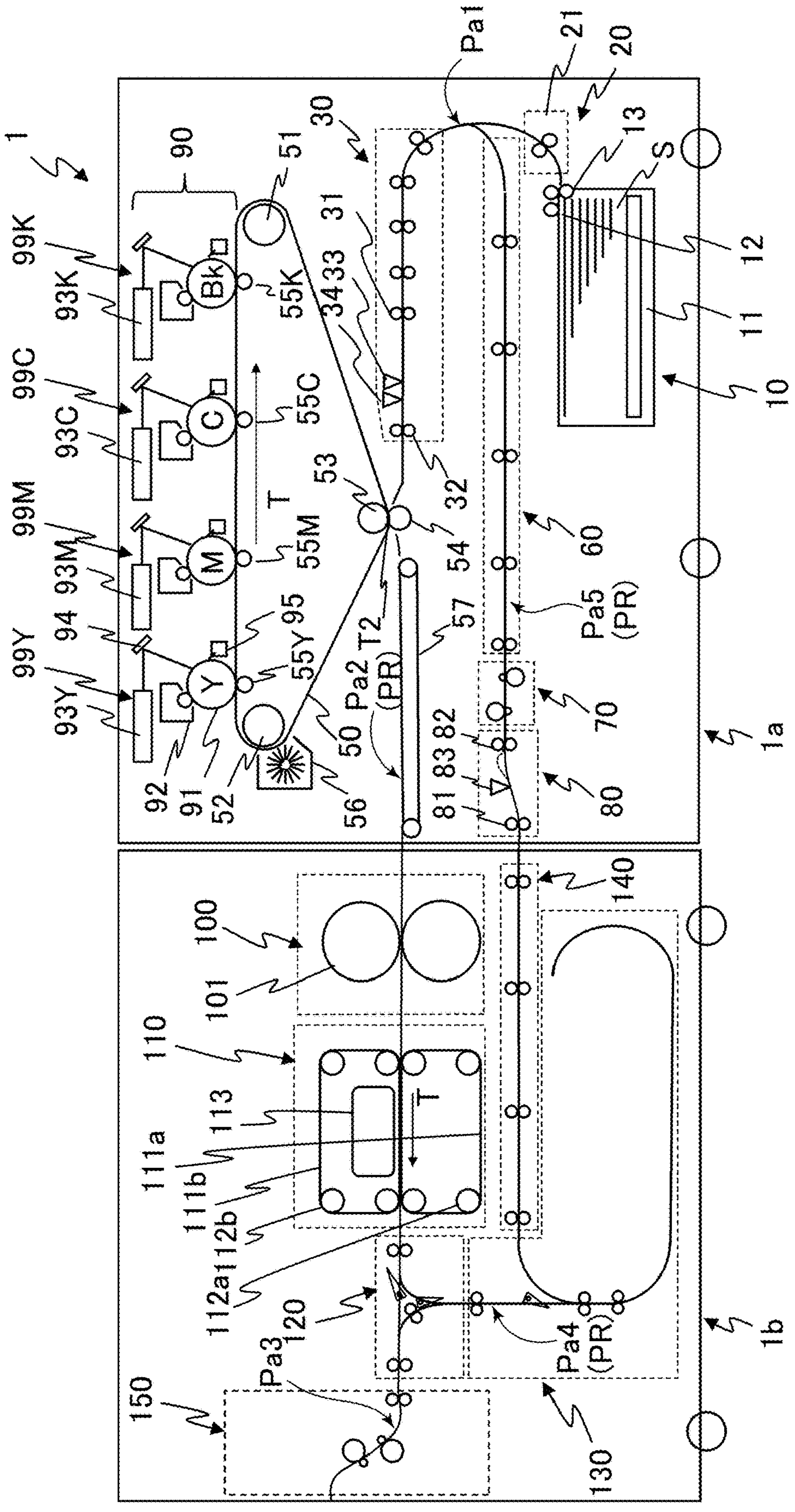
FIG. 1 is a schematic view showing a printer according to a first embodiment.

In the following, a first embodiment will be described with reference to drawings. First of all, a schematic configuration of a printer 1 as an image forming apparatus according to a first embodiment will be described with reference to FIG. 1. FIG. 1 is a sectional view showing the printer 1 according to the first embodiment.

[Schematic Configuration of Printer]

The printer 1 according to the embodiment is a full color laser beam printer which applies an electrophotographic type. As shown in FIG. 1, the printer 1 is provided with a casing 1*a* as a first casing which houses a unit which performs feeding of the sheet and image forming, and a casing 1*b* as a second casing which houses a unit which performs fixing and cooling.

The casing 1*a* includes a feeding unit 10 as a feeding portion, a drawing unit 20, a registration unit 30 as a second oblique movement correcting portion, an image forming unit 90 as an image forming portion, and a first double-sided conveying unit 60. Furthermore, the casing 1*a* includes a double-sided oblique movement correcting unit 80 as a first oblique movement correcting portion which will be specifically described below, and a double-sided decurling unit 70 as a curl correcting portion which will be specifically described below. Further, the casing 1*b* includes a fixing unit 100 as a fixing portion, a cooling unit 110 as a cooling portion, a branching conveying unit 120, a reversing conveying unit 130 as a reversing portion, a second double-sided conveying unit 140, and a discharging decurling unit 150.

The image forming unit 90 is provided with four process cartridges 99Y, 99M, 99C, and 99K which form four color toner images of yellow (Y), magenta (M), cyan (C), and black (K), respectively, and exposure devices 93Y, 93M, 93C, and 93K. Incidentally, the four process cartridges 99Y, 99M, 99C, and 99K are in the same configuration except that the colors of the images they form are different. Therefore, only a configuration and an image forming process of the process cartridge 99Y will be described, and descriptions of the process cartridges 99M, 99C, and 99K will be omitted.

The process cartridge 99Y includes a photosensitive drum 91, a charging roller which is not shown, a developing device 92, and a cleaner 95. The photosensitive drum 91 is configured by coating an organic photoconductive layer on an outer peripheral surface of an aluminum cylinder and is rotated by a driving motor which is not shown. Further, the image forming unit 90 is provided with an intermediary transfer belt 50 as an image bearing member which is rotated in a direction of an arrow T by a driving roller 52, and the intermediary transfer belt 50 is wound around a tension roller 51, a driving roller 52, and an inner secondary transfer roller 53. On an inner side of the intermediary transfer belt 50, primary transfer rollers 55Y, 55M, 55C, and 55K are provided, and on an outer side of the intermediary transfer belt 50, an outer secondary transfer roller 54 as a transfer roller is provided opposed to the inner secondary transfer roller 53.

The feeding unit 10 includes a lift plate 11 which moves up and down while stacking the sheet S, a pickup roller 12 which feeds the sheet S which is stacked on the lift plate 11, and a separating roller pair 13 which separates the sheet which is fed one by one.

The registration unit 30 includes a pre-registration roller pair 31 which conveys the sheet S and a registration roller pair 32 which corrects an oblique movement of the sheet S. Furthermore, the registration unit 30 includes a registration sensor 33 which detects a position of the sheet S with respect to a conveying direction, and a CIS 34 which detects a position of the sheet with respect to a width direction.

On the other hand, the fixing unit 100 which is disposed in the casing 1*b* includes a fixing roller pair 101 which is possible to heat. Further, the cooling unit 110 includes an upper cooling belt 111*a* which rotates in a direction of an arrow T by an upper cooling driving roller 112*a*. Similarly, the cooling unit 110 includes a lower cooling belt 111*b* which rotates in the direction of the arrow T by a lower cooling driving roller 112*b*. Further, the cooling unit 110 includes a heat sink 113 to cool the sheet.

[Image Forming Operation]

Next, an image forming operation of the printer 1 which is configured as described above will be described. For example, when an image signal is input to an exposure device 43 from a computer 300 such as an external computer (see FIG. 2), laser light which corresponds to the image signal is irradiated from the exposure device 43 onto the photosensitive drum 91 of the process cartridge 99Y.

At this time, the photosensitive drum 91 is uniformly charged with a predetermined polarity and potential on its surface by the charging roller which is not shown, and an electrostatic latent image is formed on the surface when the laser light is irradiated from the exposure device 93Y via a mirror 94. The electrostatic latent image which is formed on the photosensitive drum 91 is developed by the developing device 92, and a yellow (Y) toner image is formed on the photosensitive drum 91.

Similarly, the laser lights are also irradiated from exposure devices 93M, 93C, and 93K onto each of the photosensitive drums of the process cartridges 99M, 99C, and 99K, and toner images of magenta (M), cyan (C), and black (K) are formed on each of the photosensitive drums. Each color toner image which is formed on each photosensitive drum is transferred to the intermediary transfer belt 50 by each of the first transfer rollers 55Y, 55M, 55C, and 55K. And the full-color toner image is conveyed to a secondary transfer nip T2 as a transfer portion which is formed by the inner secondary transfer roller 53 and the outer secondary transfer roller 54, by the intermediary transfer belt 50 which is rotated by the driving roller 52. The toner which is remained on the photosensitive drum 91 is collected by the cleaner 95. Incidentally, each color image forming process is performed at a timing when a toner image is superimposed on an upstream toner image which is primarily transferred onto the intermediary transfer belt 50.

In parallel with the image forming process, the sheet S is fed from the feeding unit 10 and conveyed to the registration unit 30 by the drawing unit 20. The registration unit 30 includes the registration roller pair 32 which corrects the oblique movement of the sheet S as described above. That is, the sheet S is conveyed to the secondary transfer nip T2 at a timing when misalignment and oblique movement of the sheet S are corrected by the registration unit 30 and the full-color toner image which is formed on the intermediary transfer belt 50 reaches the secondary transfer nip T2. And on a first sheet surface (front surface) of the sheet S, the full-color toner image on the intermediary transfer belt 50 is transferred by a secondary transfer bias which is applied to the outer secondary transfer roller 54. Incidentally, a remained toner which is remained on the intermediary transfer belt 50 is collected by a belt cleaner 56.

The sheet S onto which the toner image is transferred is conveyed to the fixing unit 100 by a pre-fixing conveying portion 57. And the sheet S is guided into a nip of the fixing roller pair 101, and toner is melted and adhered (fixed) when predetermined heat and pressure are applied. The sheet S which has passed through the fixing unit 100 is nipped by the upper cooling belt 111*a* and the lower cooling belt 111*b*, which are endless belts, in the cooling unit 110, and is conveyed by rotations of the upper cooling driving roller 112*a* and the lower cooling driving roller 112*b*. And the sheet S is contacted with the heat sink 113 via the upper cooling belt 111*a*, and the sheet S is cooled by transferring heat to the heat sink 113.

Subsequently, a path selection either conveying to the discharging decurling unit 150 or conveying to the reversing conveying unit 130 is performed by the branching conveying unit 120. The reversing conveying unit 130 is capable of reversing the sheet S so that the first surface of the sheet S, on which the image has been formed in the secondary transfer nip T2, is a lower side, after the sheet S is conveyed from the branching conveying unit 120. The reversed sheet S is conveyed to the second double-sided conveying unit 140 or returned to the branching conveying unit 120.

In a case that the image is formed on only one side of the sheet S, the sheet S is conveyed from the branching conveying unit 120 to the discharging decurling unit 150, and the curl of the sheet is corrected by a small diameter hard roller and a large diameter soft roller. Consequently, the sheet S which has passed through the discharging decurling unit 150 is discharged outside of the apparatus or delivered to a discharging option device which is not shown.

In a case that the image forming is performed on both sides of the sheet S, the sheet S is conveyed to the reversing conveying unit 130 by the branching conveying unit 120 and is switched back in the reversing conveying unit 130. The sheet S, which is switched back, is conveyed from the reversing conveying unit 130 to the second double-sided conveying unit 140, the double-sided oblique movement correcting unit 80, the double-sided decurling unit 70, and the first double-sided conveying unit 60, and is guided to the registration unit 30. After this, the image is formed on a second surface (back surface) of the sheet S in the secondary transfer nip T2, and the sheet S is discharged outside of the apparatus via the branching conveying unit 120 and the discharging decurling unit 150, or delivered to the discharging option device which is not shown.

[Conveying Path of Printer]

Here, a conveying path of the sheet S in the printer 1 will be described. On the whole, the printer 1 includes a feeding path Pa1, a post-transfer conveying path Pa2, a discharging path Pa3, a reversing path Pa4, and a post-reverse path Pa5 as paths which convey the sheet S. The sheet S, which is drawn from the feeding unit 10 by the drawing unit 20 and fed, is conveyed so as to be guided through the feeding path Pa1 to the secondary transfer nip T2 of the image forming unit 90. The sheet S, onto which the toner image has been transferred in the secondary transfer nip T2 of the image forming unit 90, is conveyed so as to be guided through the post-transfer conveying path Pa2 to the branching conveying unit 120. The sheet S, which is discharged through the discharging decurling unit 150 by the branching conveying unit 120, is conveyed so as to be guided through the discharging path Pa3. On the other hand, the sheet S, which is conveyed to the reversing conveying unit 130 by the branching conveying unit 120, is conveyed so as to be guided through the reversing path Pa4. And the sheet S, which has been reversed in a conveying direction (front and back) by the reversing conveying unit 130 in a case that it is printed on both sides, is conveyed so as to be guided through the post-reverse path Pa5 and conveyed so as to merge with the feeding path Pa1.

That is, the sheet S, of which the image is formed on the first surface in the case that it is printed on both sides, is conveyed from the secondary transfer nip T2 of the image forming unit 90 through a reconveying path PR to the feeding path Pa1. In other words, the reconveying path PR, which reconveys the sheet S so as to return to the secondary transfer nip T2 of the image forming unit 90, is configured to include the post-transfer conveying path Pa2, the reversing path Pa4, and the post-reverse path Pa5. Furthermore, the double-sided oblique movement correcting unit 80 and the double-sided decurling unit 70, which will be described below in detail, are disposed so as to be interposed in the post-reverse path Pa5 of the reconveying path PR. Further, the feeding unit 10 is disposed so as to be interposed in the feeding path Pa1.

[Configuration of Printer Control System]

Figure 2:
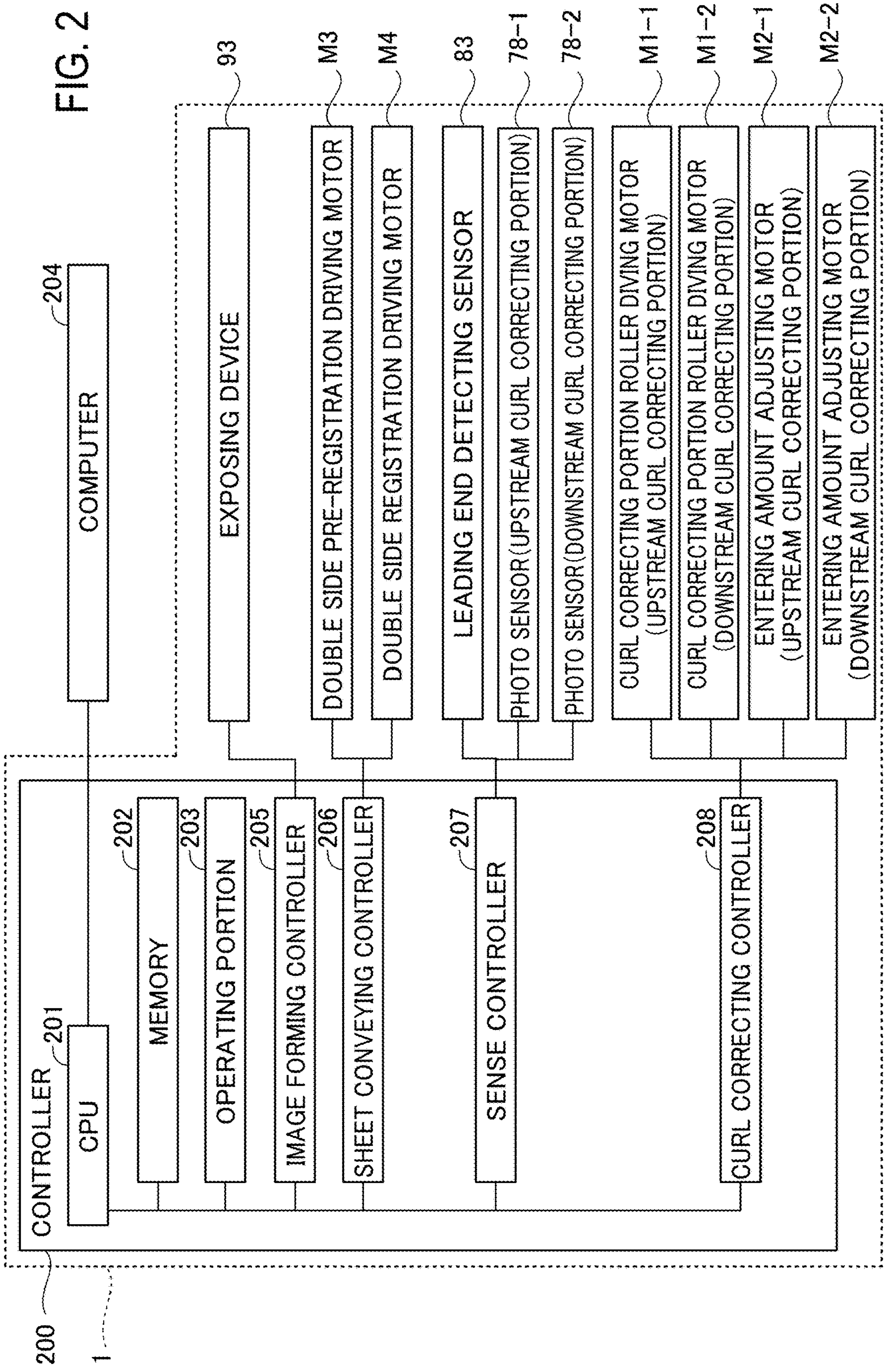
FIG. 2 is a block diagram showing a control system of the printer.

Next, a configuration of a control system of the printer 1 will be described with reference to FIG. 2. FIG. 2 is a block diagram showing the control system of the printer.

As shown in FIG. 2, a control portion 200 of the printer 1 includes a CPU 201, and the CPU 201 is connected to a memory 202, an operating portion 203, an image forming control portion 205, a sheet convey control portion 206, a sensor control portion 207, and a curl correcting control portion 208. Further, the control portion 200 of the printer 1 is connected to an external computer 204 and receives various information, printing execution command, etc.

The memory 202 includes so-called RAM, ROM, etc. The operating portion 203 is an operating panel which is not shown in FIG. 1. The image forming control portion 205 is connected to each color of the exposure devices 93 which is described above, and forms the image which will be transferred to the sheet S by exposing the photosensitive drum 91.

The sheet convey control portion 206 controls various rollers and conveys the sheet S. In particular, the sheet convey control portion 206 is connected to a double-sided pre-registration driving motor M3 which drives a double-sided pre-registration roller pair 81 of the double-sided oblique movement correcting unit 80, and to a double-sided registration motor M4 which drives a double-sided registration roller pair 82, which will be specifically described below.

The sensor control portion 207 is connected to a leading end position detecting sensor 83 which is provided with the double-sided oblique movement correcting unit 80, which will be described below. Further, the sensor control portion 207 is connected to photosensors 78-1 and 78-2 which are provided with an upstream curl correcting portion 70A and a downstream curl correcting portion 70B of the double-sided decurling unit 70, respectively, which will be described below.

And the curl correcting control portion 208 is connected to curl correcting roller driving motors M1-1 and M1-2 which drive curl correcting rollers 71*a* and 72*a* which are provided with the upstream curl correcting portion 70A and the downstream curl correcting portion 70B, respectively. Furthermore, the curl correcting control portion 208 is connected to invading (entering) amount adjusting motors M2-1 and M2-2 which adjust invading amount of a driven correcting roller 71*b* and a driven correcting roller 72*b* with respect to the curl correcting roller 71*a* and the curl correcting roller 72*a*.

Incidentally, the image forming control portion 205, the sheet convey control portion 206, the sensor control portion 207, and the curl correcting control portion 208 are configurations as function realizing portions which perform their functions when the CPU 201 executes programs which are stored in the memory 202. Further, an operation of the printer 1, which functions by these function realizing portions, will be described below.

[Double-Sided Decurling Unit]

(Occurrence of Curling and its Problems)

Next, a cause of an occurrence of curling of the sheet S will be described with reference to part (a) and part (b) of FIG. 3. Part (a) of FIG. 3 is a perspective view showing a sheet whose surface is curled in a concave shape. Part (b) of FIG. 3 is a perspective view showing a sheet whose surface is curled in a convex shape.

The sheet S, on which the toner image is fixed by the image forming operation of the printer 1 which is described above, undergoes a change in a balance of moisture content within the surface between the first surface (front surface) and the second surface (back surface) which is an opposite side of the first surface due to an effect of being heated in the fixing unit 100. Therefore, curling of the sheet S may be occurred, as the surface of the sheet S may be curled in the concave shape as shown in Part (a) of FIG. 3, or the surface of the sheet S may be curled in the convex shape as shown in Part (b) of FIG. 3. Incidentally, the curl may also be occurred when stiffness is imparted to the sheet S in each conveying path, the nip of each conveying roller pair, the nip of the fixing roller pair 101, etc. Furthermore, the curl may also be occurred by a difference in toner shrinkage rates between a surface with high toner density and a surface with low toner density after the toner image is heated and fixed, and a difference in cooling rates between the first surface and the second surface of the sheet S, etc.

The toner image may not be accurately transferred to the sheet and an image defect may be occurred, when the sheet is conveyed to the secondary transfer nip T2 while the sheet is curled significantly, particularly during the image forming of the second surface when it is printed on both sides, in a state that an amount of curl which is occurred to the sheet S is large. Further, paper jam may be occurred due to a separation defect after passing through the secondary transfer nip T2. Furthermore, a nip entering attitude of the sheet may be worsened due to the curl and a wrinkle and a fixing defect may be occurred, in the nip of the fixing roller pair 101. These defects may become more significant, since allowance for curling becomes smaller due to lack of stiffness as rigidity of the sheet is lower such as thin paper.

Because of this, the double-sided decurling unit 70 is provided on the reconveying path PR which is described above, specifically on the post-reverse path Pa5 in the embodiment. And after correcting the curl by the double-sided decurling unit 70, it is configured that the sheet S is conveyed through the secondary transfer nip T2 in order to transfer the image onto the second surface.

(Configuration and Operation of Double-Sided Decurling Unit 70)

Next, a specific configuration of the double-sided decurling unit 70 will be described by using from FIG. 4 through FIG. 8. FIG. 4 is a schematic diagram showing the double-sided decurling unit according to the first embodiment. Part (a) of FIG. 5 is a schematic diagram showing a state that decurling the sheet which is curled in the concave shape is decurled by the double-sided decurling unit. Part (b) of FIG. 5 is a schematic diagram showing a state that decurling the sheet which is curled in the convex shape is decurled by the double-sided decurling unit. FIG. 6 is a perspective view showing an invading amount adjusting mechanism of an upstream curl correcting roller pair. FIG. 7 is a schematic view showing a state that an invading amount is small in the invading amount adjusting mechanism of the upstream curl correcting roller pair. FIG. 8 is a schematic view showing a state that the invading amount is large in the invading amount adjusting mechanism of the upstream curl correcting roller pair. Incidentally, a configuration of the discharging decurling unit 150 is also same as that of the double-sided decurl unit 70 which will be described below, so specific descriptions will be omitted. The discharging decurling unit 150 is provided to reduce the curl when delivering the sheet to a processing device which is not shown, etc. which is connected to the printer 1 on a downstream side with respect to the conveying direction.

As shown in FIG. 4, the double-sided decurling unit 70 includes an upstream curl correcting portion 70A which is disposed on an upstream side with respect to the conveying direction and the downstream curl correcting portion 70B which is disposed on a downstream side with respect to the conveying direction relative to the upstream curl correction portion 70A. The upstream curl correcting portion 70A is provided with an upstream curl correcting roller pair 71, and the downstream curl correcting portion 70B is provided with a downstream curl correcting roller pair 72.

The upstream curl correcting roller pair 71 includes the curl correcting roller 71*a* as a first roller which is configured of a metal member such as SUS, for example, which is rotated by the curl correcting roller driving motor M1-1. Further, the upstream curl correcting roller pair 71 includes the driven correcting roller 71*b* as a second roller which is configured of a soft elastic member such as urethane foam and forms a first nip portion N1 while pressing the curl correcting roller 71*a*. Similarly, the downstream curl correcting roller pair 72 includes the curl correcting roller 72*a* as a third roller which is configured of a metal member such as SUS, for example, which is rotated by the curl correcting roller driving motor M1-2. Further, the downstream curl correcting roller pair 72 includes the driven correcting roller 72*b* as a fourth roller which is configured of a soft elastic member such as urethane foam and forms a second nip portion N2 while pressing the curl correcting roller 72*a*. And the driven correcting roller 71*b* and the driven correcting roller 72*b* presses the curl correcting roller 71*a* and the curl correcting roller 72*a*, while changing the invading amount according to phases of cam members which will be described below.

By the way, the nip portion N1 of the upstream curl correcting roller pair 71 is curved since the curl correcting roller 71*a* cuts into the driven correcting roller 71*b* as shown in FIG. 4. And the curl of the concave shaped sheet, which is curved upward in a first curl direction at both end portions of the sheet with respect to the conveying direction as shown in part (a) of FIG. 3, is corrected by the upstream curl correcting roller pair 71 which includes the nip portion N1 which is curved as described above. Further, the curl in the convex shape, which is curved downward in a second curl direction which is an opposite direction to the first curl direction at both end portions of the sheet with respect to the conveying direction as shown in part (b) of FIG. 3, is corrected by the downstream curl correcting roller pair 72.

Here, in order to increase a curl correcting amount, it is necessary to arrange a large curvature at the nip portion N, so it is desirable that diameter of a roller which is used as the curl correcting roller 71*a* is smaller than that of the other conveying rollers, and the roller whose diameter is φ8 mm is used in the embodiment. Further, it is desirable that diameter of the driven correcting roller 71*b* whose hardness is different from the curl correcting roller 71*a* is large, and the roller whose diameter is φ24 mm is used in the embodiment. Incidentally, configurations of the curl correcting roller 72*a* and the driven correcting roller 72*b* are also similar.

And when the sheet S is conveyed to the double-sided decurling unit 70 whose configuration is like this, the sheet S is conveyed to the nip portion of the upstream curl correcting roller pair 71 and the curl whose shape is concave is corrected. Next, the sheet S is conveyed to the nip portion of the downstream curl correcting roller pair 72 and the curl whose shape is convex is corrected. And in this way, while the curl is corrected, the sheet S is delivered to the first double-sided conveying unit 60.

Incidentally, in the embodiment, as shown in part (a) of FIG. 5, in a case that the curl whose shape is concave is corrected, the curvature of the nip portion N1 of the upstream curl correcting roller pair 71 is increased, and the curvature of the nip portion N2 of the downstream curl correcting roller pair 72 is decreased. Further, in a case that the curl whose shape is convex is corrected, as shown in part (b) of FIG. 5, the curvature of the nip portion N1 of the upstream curl correcting roller pair 23 is decreased, and the curvature of the nip portion N2 of the downstream curl correcting roller pair 24 is increased.

By the way, an amount of the curl is changed depending on various parameters such as temperature and humidity, moisture content of the sheet, types of the sheet, thickness of the sheet, and image density, the curl correcting amount is determined according to those parameters. And based on the determined correcting amount, the control portion 200 changes the invading amount (pressing force), in other words a shape of the nip portion, of the driven correcting rollers 72*b* and 72*b* with respect to the curl correcting rollers 71*a* and 72*a*, by an amount of rotation of the cam member which will be described below.

Next, an invading amount adjusting mechanism 70Aa as a first pressing amount adjusting portion for changing the invading amount (pressing force) of the driven correcting rollers 71*b* and 72*b* with respect to the curl correcting rollers 71*a* and 72*a* will be described with reference to FIG. 6. Incidentally, FIG. 6 shows the invading amount adjusting mechanism 70Aa of the upstream curl correcting portion 70A, and a configuration of the invading amount adjusting mechanism 70Ab as a second press adjusting portion of the downstream curl correcting portion 70B is similar to the invading amount adjusting mechanism 70Aa, so the description will be omitted.

As shown in FIG. 6, the invading amount adjusting mechanism 70Aa includes a swinging member 75 which rotatably holds the driven correcting roller 71*b*. The swinging member 75 swings around swinging centers 76*a* and 76*b* as fulcrums, and roller members 74*a* and 74*b* are rotatably provided at swinging ends. And cam members 73*a* and 73*b* which rotate by driving force of the invading amount adjusting motor M2-1 as a driving portion which is possible to rotate in both forward and reverse directions (that is, it is possible to rotate in a first direction and a second direction which is opposite to the first direction) are pressed against the roller members 74*a* and 74*b*. The cam members 73*a* and 73*b* include cam surfaces whose outer peripheral surfaces gradually change in height from rotational centers. Further, the photosensor 78-1 detects home positions (HP) of the cam members 73*a* and 73*b* by detecting HP detecting flag 77 of the cam members 73*a* and 73*b*.

Here, as shown in FIG. 7, the roller members 74*a* and 74*b*, which are held by the swinging member 75, always contact the outer peripheral surfaces of the cam members 73*a* and 73*b*, by a reaction force of the driven correcting roller 71*b* which presses against the curl correcting roller 71*a*, or by a pressing member which is not shown. And, for example, when a power source of the printer 1 is turned on, the control portion 200 drives the invading amount adjusting motor M2-1 to adjust the invading amount (pressing force) of the driven correcting roller 71*b* with respect to the curl correcting roller 71*a* according to the curl correcting amount, and rotates the cam members 73*a* and 73*b*.

Incidentally, when rotating the cam members 73*a* and 73*b*, the control portion 200 determines rotation angles from reference angles of the cam members 73*a* and 73*b* according to the curl correcting amount. And based on a signal from the photosensor 78-1, it detects that the cam members 73*a* and 73*b* are in a home position. Subsequently, by driving the invading amount adjusting motor M2-1, the cam members 73*a* and 73*b* are rotated by a predetermined amount according to steps from the home position, and the invading amount (pressing force) of the upstream curl correcting roller pair 71 is adjusted in a plurality of steps. That is, the cam members 73*a* and 73*b* adjust a nip pressure of the upstream curl correcting roller pair 71 by moving one of the upstream curl correcting roller pair 71 with respect to the other one. Incidentally, the downstream curl correcting roller pair 72 also adjusts its nip pressure in a similar manner.

Specifically, as shown in FIG. 8, when the invading amount adjusting motor M2-1 is driven and the cam members 73*a* and 73*b* rotate in a direction of an arrow W, the swinging member 75 swings around the swinging centers 76*a* and 76*b* in a direction of an arrow B and a direction of an arrow C via the roller members 74*a* and 74*b*. And in accordance with this, the driven correcting roller 71*b* moves in a direction of an arrow D. As a result, the driven correcting roller 71*b* presses against the curl correcting roller 71*a*, and the curl correcting roller 71*a* invades the driven correcting roller 71*b* by a predetermined amount.

By the way, as disclosed in JP-A Hei 9-249345, it may be possible to prevent wrinkle generation during decurling of the sheet by not forming the curl correcting roller and the driven correcting roller in the entire width direction. However, in this configuration, it is possible that the curl may be remained at the end portions with respect to the width direction, particularly in a case that the curl of the sheet whose rigidity is low such as thin paper is corrected. In this case, a conveying defect may be occurred when it is printed on both sides, a separation defect in which the sheet is wound around rollers in the secondary transfer nip and the fixing roller pair may be occurred, or the toner image may not be accurately transferred to the end portions with respect to the width direction in the secondary transfer nip. Therefore, the curl correcting rollers 71*a* and 72*a* and the driven correcting rollers 72*a* and 72*b* according to the embodiment apply so-called one single roller in which the nip portion is longer with respect to the width direction than the sheet which is maximum size in the width direction in which the printer 1 is possible to print. In this way, the curl is prevented from remaining at the end portions with respect to the width direction. However, in such a roller which is long with respect to the width direction, a difference in a velocity vector may be easily occurred at a different position in the width direction. The problem will be described below.

[Double-Sided Oblique Movement Correcting Unit]

Next, a configuration and an operation of the double-sided oblique movement correcting unit 80 which is possible to execute an oblique movement correction of the sheet S will be described with reference to FIG. 9. Part (a) of FIG. 9 is a view showing a state that the sheet has been conveyed to a double-sided pre-registration roller pair in a double-sided oblique movement correcting unit. Part (b) of FIG. 9 is a view showing a state that the sheet has been conveyed to a double-sided registration roller pair in the double-sided oblique movement correcting unit. Part (c) of FIG. 9 is a view showing a state that the sheet is started to be conveyed from the double-sided registration roller pair toward a downstream side in the double-sided oblique movement correcting unit. Incidentally, a configuration and an operation of the registration unit 30 are also similar to those of the double-sided oblique movement correcting unit 80, so the description will be omitted.

The double-sided oblique movement correcting unit 80 is provided with the double-sided pre-registration roller pair 81 on an upstream side with respect to the conveying direction and the double-sided registration roller pair 82 on a downstream side with respect to the conveying direction. The double-sided pre-registration roller pair 81 is rotationally driven by the double-sided pre-registration driving motor M3 which is described above, and the double-sided registration roller pair 82 is rotationally driven by the double-sided registration driving motor M4 which is described above (see FIG. 2). Further, immediately upstream of the double-sided pre-registration roller pair 81, the leading end position detecting sensor 83 is disposed and detects a timing when the leading end of the sheet S reaches the double-sided registration roller pair 82.

As described above, after the image is formed on the first surface of the sheet S, the sheet S is conveyed to the reversing conveying unit 130 by the branching conveying unit 120, and a proceeding direction (conveying direction) of the sheet is reversed (switchback reverse) in the reversing conveying unit 130 (see FIG. 1). The reversed sheet S is conveyed to the second double-sided conveying unit 140, and subsequently, conveyed to the double-sided pre-registration roller pair 81 of the double-sided oblique movement correcting unit 80.

Here, the sheet S which has been conveyed is, for example, in a state of being rotated clockwise in the figure with respect to a conveying direction A as shown in part (a) of FIG. 9, that is, in a state of an oblique movement. Then, first of all, a leading end of the sheet S, which has been conveyed, is abutted with the nip portion of the double-sided registration roller pair 82 which is stopped and is aligned with the double-sided registration roller pair 82. After that, as shown in part (b) of FIG. 8, the control portion 200, based on a detected result of the leading end position detecting sensor 83, conveys the sheet S by using the double-sided pre-registration roller pair 81 to achieve a feeding amount which is set, and a predetermined amount of a loop is formed in the sheet S. And as shown in part (c) of FIG. 8, a rotation of the double-sided registration roller pair 82 which is stopped is started, and the sheet S is conveyed by the double-sided registration roller pair 82. Therefore, the oblique movement of the sheet S which is located on an upstream side from the loop does not affect a portion of the sheet S which is located on a downstream side from the loop. That is, the leading end of the sheet S is conveyed to the double-sided decurling unit 70 (see FIG. 1) while maintaining a state of being parallel to the double-sided registration roller pair 82, and it is possible to convey the sheet S, in which the oblique movement is corrected, to the double-sided decurling unit 70.

[Mechanism of Wrinkle Generation During Curl Correction of Obliquely Moving Sheet]

Next, a mechanism of wrinkle generation during a curl correction of an obliquely moving sheet S will be described with reference to from FIG. 10 through FIG. 13. Part (a) of FIG. 10 is a top view showing a state that the sheet is obliquely conveyed to the upstream curl correcting roller pair. Part (b) of FIG. 10 is a schematic sectional view showing a difference of a velocity vector which is occurred between a receding side and an advancing side with respect to a width direction of the sheet. FIG. 11 is a view showing a three dimensional simulation image in a case that the obliquely moving sheet is conveyed to the double-sided decurling unit. Part (a) of FIG. 12 is a graph showing a result of the three dimensional simulation in a case that the sheet whose oblique amount is large is conveyed to the double-sided decurling unit. Part (b) of FIG. 12 is a graph showing a result of the three dimensional simulation in a case that the sheet whose oblique amount is small is conveyed to the double-sided decurling unit. Part (a) of FIG. 13 is a graph showing a relationship among an oblique amount, an amount of curl correcting invasion, and wrinkle generation in a case that a sheet type is thin paper. Part (b) of FIG. 13 is a graph showing a relationship among an oblique amount, an amount of curl correcting invasion, and wrinkle generation in a case that a sheet type is ultrathin paper.

As described above, for a sheet such as thin paper whose rigidity is lower (less stiffness) than plain paper, it is necessary to correct the curl with high accuracy in order to reduce image forming defects on the second surface and conveying defects. However, in a case of correcting the curl of the sheet which is lack of stiffness such as thin paper, it is necessary to be careful of wrinkle generation.

As shown in part (a) of FIG. 10, when the sheet is conveyed to the upstream curl correcting roller pair 71 (or the downstream curl correcting roller pair 72), the sheet is obliquely moving. In this case, like shown as a velocity vector B1 on the receding side and a velocity vector B2 on the advancing side in part (b) of FIG. 10, a difference in the velocity vectors may be occurred. Even in a case that the difference in the velocity vectors is such small, a stress which is applied within the surface of the sheet is increased and the wrinkle is generated. In particular, when the upstream curl correcting roller pair 71 (or the downstream curl correcting roller pair 72) is one single roller which is long in the width direction, the difference in the velocity vectors may be easily occurred at both end portions of the sheet S.

In a case that the sheet S is conveyed to the upstream curl correcting roller pair 71 and the downstream curl correcting roller pair 72, an effect while the sheet S is obliquely moving is analyzed by a three-dimensional simulation (hereinafter referred to as “3D SIM”) as shown in FIG. 11. In FIG. 11, a state of a simulation, in a case that the sheet S which is obliquely moving is conveyed to the upstream curl correcting roller pair 71 and the downstream curl correcting roller pair 72, is shown.

Results which are obtained by the 3D SIM as shown in FIG. 11 are shown in part (a) of FIG. 12 and part (b) of FIG. 12. Incidentally, graphs which are shown in part (a) of FIG. 12 and part (b) of FIG. 12 are velocity distributions of the sheet in the nip of the upstream curl correcting roller pair 71 at a certain time. In the graphs, a horizontal axis indicates a coordinate value with respect to the width direction of the sheet S and a vertical axis indicates a contact point velocity at each coordinate value.

As shown in a graph of part (a) of FIG. 12, in a case that an oblique angle of the sheet S which is conveyed to the upstream curl correcting roller pair 71 is large, there is a point in which a speed of the sheet S is decreased sharply. And in an actual experiment, it is found that the wrinkle is occurred at the point. In contrast, in a case that the oblique angle of the sheet which is conveyed to the upstream curl correcting roller pair 71 is small, as shown in a graph of part (b) of FIG. 12, the speed of the sheet is remained stable across an entire area of the sheet S with respect to the width direction of the sheet S, and wrinkle is not generated. Incidentally, these phenomena are also similar to cases of the downstream curl correcting roller pair 72.

As described above, in a case that the sheet S is obliquely moving while the sheet S is conveyed to either the upstream curl correcting roller pair 71 or the downstream curl correcting roller pair 72, the stress which is applied within the surface of the sheet is increased and the wrinkle is generated even when the difference in the velocity vectors is small. This mechanism is confirmed by a result which is obtained by 3D SIM. Further, it is found that the generation of the wrinkle is particularly pronounced in thin paper.

Part (a) of FIG. 13 and part (b) of FIG. 13 are graphs showing whether the wrinkle is generated or not, in relation to the invading amount (hereinafter referred to as "amount of curl correcting invasion") in the upstream curl correcting roller pair 71 and the oblique amount of the sheet S which is conveyed to the upstream curl correcting roller pair 71. That is, in the graphs, a horizontal axis indicates the invading amount, and a vertical axis indicates the oblique amount of the sheet S. Incidentally, the amount of the curl correcting invasion refers to an invading amount of the curl correcting roller 71*a* relative to the driven correcting roller 71*b*, which is described above. In the embodiment, for example, it is possible to adjust the invading amount in eight steps from "0" to "7", and a larger number of step corresponds to a greater invading amount. Further, since the graphs are similar to the downstream curl correcting roller pair 72, in the following, the upstream curl correcting roller pair 71 will be described as an example. However, since a direction of invading toward the sheet S in the amount of curl correcting invasion of the downstream curl correcting roller pair 72 is opposite to that in the amount of curl correcting invasion of the upstream curl correcting roller pair 71, in the embodiment, the invading amount will be described in eight steps from "0" to "−7" in a minus direction.

As shown in part (a) of FIG. 13 and part (b) of FIG. 13, it is found that the wrinkle is generated as each of the amount of curl correcting invasion to the upstream curl correcting roller pair 71 and the oblique amount of the sheet S which is conveyed to the upstream curl correcting roller pair 71 increases. Further, it is found that an area of the graph in which the wrinkle is generated is larger in a case that the sheet S is ultrathin paper rather than thin paper, that is, stiffness of the sheet S is lower.

For example, when the oblique amount of the sheet S which is conveyed to the upstream curl correcting roller pair 71 is set to 3 mm, the wrinkle is not generated on thin paper until the amount of curl correcting invasion of the upstream curl correcting roller pair 71 reaches "4". In contrast, it is found that the wrinkle may be generated on ultrathin paper, even when the amount of curl correcting invasion of the upstream curl correcting roller pair 71 is "1". That is, it is confirmed that as the thickness of the sheet S decreases, its stiffness decreases and the wrinkle is easily generated.

Here, a difference between a general conveying roller pair and a decurl correcting roller pair (that is, the upstream curl correcting roller pair 71 and the downstream curl correcting roller pair 72) will be described. In the general conveying roller pair, since the rollers do not invade deeply into the nip, a difference of velocity vectors is hardly occurred when the sheet S is conveyed to the nip. Therefore, a phenomenon that the wrinkle is generated due to the oblique movement is considered to be a unique phenomenon specific to the decurl correcting roller pair. A state of the general conveying roller pair corresponds to a state the amount of curl correcting invasion of the upstream curl correcting roller pair 71 is "0" or "1" in the graphs such as part (a) of FIG. 13 and part (b) of FIG. 13. Therefore, it may be said that a possibility of generating the wrinkle is low, even when the oblique amount of the sheet S which is conveyed to the nip of the general conveying roller pair is large.

As described above, it is difficult to achieve both reducing wrinkle generation and correcting the curl with high accuracy, due to an effect of the oblique movement of the sheet S in a case of thin paper and ultrathin paper. On the other hand, as described above, the curl is easy to occur in a case of the sheet such as thin paper and ultrathin paper whose rigidity is lower, and it is necessary to correct the curl with high accuracy in order to reduce image forming defects on the second surface and conveying defects.

Therefore, in the embodiment, as described above, the double-sided oblique movement correcting unit 80 is disposed upstream of the double-sided decurling unit 70 with respect to the conveying direction of the sheet S in the reconveying path PR. In this way, as shown in part (a) of FIG. 13 and part (b) of FIG. 13, while the oblique amount of the sheet S becomes closer to "0.0" and the curl is corrected with high accuracy in the double-sided decurling unit 70, it is possible to prevent the wrinkle from generating on the sheet. Especially, in the case that it is printed on both sides, since the double-sided decurling unit 70 is disposed downstream of the fixing unit 100 (cooling unit 110) with respect to the conveying direction, it is possible to decurl the curl, which is occurred in the fixing unit 100, with the double-sided decurling unit 70.

Incidentally, the curl is easily occurred by releasing steam unevenly on one side of the sheet S by being heated with the fixing unit 100, however, the curl may be occurred due to uneven cooling on one side of the sheet S with the cooling unit 110. Therefore, in a case of the printer 1 which is provided with the cooling unit 110, it is preferable that the double-sided decurling unit 70 is disposed downstream of the cooling unit 110 with respect to the conveying direction.

Further, for example, when the double-sided oblique movement correcting unit 80 is disposed upstream of the reversing conveying unit 130 with respect to the conveying direction, and the sheet S, whose oblique movement has been corrected by the double-sided oblique movement correcting unit 80, may obliquely move again in the reversing conveying unit 130. However, when it is printed on both sides, the double-sided oblique movement correcting unit 80 is disposed downstream of the reversing conveying unit 130 with respect to the conveying direction. Therefore, it is possible to reduce a chance that the sheet S, whose oblique movement has been corrected in the double-sided oblique movement correcting unit 80, obliquely moves again and is conveyed to the double-sided decurling unit 70.

Further, in the first embodiment, the double-sided oblique movement correcting unit 80, the double-sided decurling unit 70, and the image forming unit 90 are all disposed inside the same casing 1*a*. Since the double-sided decurling unit 70 and the image forming unit 90 are disposed in the same casing 1*a*, it is possible to reduce a chance that the sheet S which has been corrected obliquely moves again and is conveyed to the image forming unit 90. Further, especially, when the double-sided oblique movement correcting unit 80 and the double-sided decurling unit 70 are disposed in separate casings, the sheet S may obliquely move in a case that the sheet S passes through a connection part of the casing, depending on a mounting environment of the casing. However, by disposing both the double-sided oblique movement correcting unit 80 and the double-sided decurling unit 70 in the same casing 1*a*, it is possible to reduce the chance that the sheet S, whose oblique movement has been corrected in the double-sided oblique movement correcting unit 80, obliquely moves again and is conveyed to the double-sided decurling unit 70.

[Control of Invading Amount Adjusting Mechanism of the Double-Sided Decurling Unit 70]

Next, the control of the invading amount adjusting mechanism for the double-sided decurling unit 70 will be described with reference to FIG. 14. FIG. 14 is a curl correction table which records a relationship of an amount of curl correcting invasion with respect to a sheet type, an environmental humidity, and an image density.

As described above, the double-sided decurling unit 70 includes the invading amount adjusting mechanism 70Aa of the upstream curl correcting portion 70A and an invading amount adjusting mechanism (not shown) of the downstream curl correcting portion 70B. And the invading amount adjusting mechanism 70Aa of the upstream curl correcting portion 70A is capable of adjusting of the amount of curl correcting invasion in eight steps from “0” to “7”, and the invading amount adjusting mechanism of the downstream curl correcting portion 70B is capable of adjusting of the amount of curl correcting invasion in eight steps from “0” to “−7”. Incidentally, in a case that the amount of curl correcting invasion is from “0” to “7”, the invading amount adjusting mechanism of the downstream curl correcting portion 70B maintains the amount of curl correcting invasion at “0”. Further, in a case that the amount of curl correcting invasion is from “0” to “−7”, the invading amount adjusting mechanism 70Aa of the upstream curl correcting portion 70A maintains the amount of curl correcting invasion at “0”.

Here, since the amount of curl is changed depending on the various parameters such as temperature and humidity, moisture content of the sheet S, types of the sheet S, thickness of the sheet S, and image density, the amount of curl correcting invasion is determined according to each parameter. And based on the determined amount of curl correcting invasion, the control portion 200 controls the invading amount adjusting mechanism 70Aa of the upstream curl correcting portion 70A and the invading amount adjusting mechanism of the downstream curl correcting portion 70B. That is, the control portion 200 changes the invading amount (pressing force) of the driven correcting roller 72*b* (72*b*) with respect to the curl correcting roller 71*a* (72*a*).

At this time, the control portion 200 is set to adjust the amount of curl correcting invasion to one of 15 steps from “−7” to “7” by referring to the curl correction table which is shown in FIG. 14. The curl correction table in FIG. 14 is a table data in order to change the amount of curl correcting invasion according to a sheet thickness (sheet type) and an image density in a low humidity environment or a high humidity environment. That is, the control portion 200 sets a condition so that the amount of curl correcting invasion becomes smaller in an absolute value as a lower humidity environment, or in other words, the amount of curl correcting invasion becomes larger in an absolute value as a higher humidity environment. Incidentally, the printer 1 is provided with a humidity sensor, for example, which is not shown, and the control portion 200 determines a humidity environment inside the printer 1 based on a detected result by the humidity sensor.

Further, in the embodiment, as indicated in FIG. 14, the amount of curl correcting invasion is set according to the sheet thickness, for example, such as ultrathin paper, thin paper, plain paper, and thick paper. That is, the control portion 200 sets a condition so that the amount of curl correcting invasion becomes larger in an absolute value as a thinner sheet thickness (lower rigidity).

Further, in the embodiment, as shown in FIG. 14, the amount of curl correcting invasion is set according to the image density, for example, such as low density, medium density, and high density. That is, since the sheet S tends to form a concave curl shape when the density of the image which is formed on the first surface is lower (see part (a) of FIG. 5), the control portion 200 sets a condition so that the amount of curl correcting invasion becomes larger in a positive direction (that is, the invading amount of the upstream curl correcting portion 70A becomes larger). In contrast, the sheet S tends to form a convex curl shape when the density of the image which is formed on the first surface is higher (see part (b) of FIG. 5), the control portion 200 sets a condition so that the amount of curl correcting invasion becomes larger in a negative direction (that is, the invading amount of the downstream curl correcting portion 70B becomes larger).

As described above, the amount of curl in the sheet S which forms an image on the first surface tends to be larger as higher humidity environment, further it tends to be larger as thinner sheet thickness, and furthermore it tends to be larger as higher image density, so the amount of curl correcting invasion is controlled to be larger accordingly. And as it is found from the curl correction table, it is necessary to increase the amount of curl correcting as thinner paper, and as described above, it is necessary to reduce the wrinkle generation as thinner paper.

[Control of Double-Sided Oblique Movement Correcting Unit 80]

Consequently, a control of the double-sided oblique movement correcting unit 80 will be described with reference to FIG. 15. FIG. 15 is a flow chart showing a control of the double-sided oblique movement correcting unit.

As indicated in FIG. 15, first of all, the control portion 200 starts a print job (S101), according to receiving information (print job information) of a print execution instruction from a user, for example via the computer 204. Incidentally, the user is possible to instruct the number of copies to print, etc. and to specify a type of the sheet which is used for printing, etc.

And when printing on the first surface (frond surface) of the sheet S is executed (S102), it determines whether a content of a print job is “printing on both sides” or not (S103). In a case that the content of the print job is not "printing on both sides" (NO in S103), it proceeds directly to step S110 and determines whether a subsequent paper (next sheet to print) is existed or not. In a case that the subsequent paper is existed (NO in S109), it returns to step S102 and executes printing on the first surface of the next sheet S, and in a case that the subsequent paper is not existed (YES in S109), it terminates the print job (S110) and terminates the control.

On the other hand, in step S103, when it is determined that it is "printing on both sides" (S103 YES), first of all, it is determined whether basis weight of the sheet S is equal to or less than a predetermined value (for example, 75 gsm) as a second threshold value (S104), based on information of a type of the sheet S. In a case that the basis weight of the sheet S is not equal to or less than the predetermined value (NO in S104), it proceeds directly to step S108 and printing on the second surface (back surface) of the sheet S is performed. That is, it is possible to prevent generation of noise when the sheet S is abutted, and, further, it is possible to improve a productivity since a conveying speed of the sheet S is not decreased, by not performing the oblique movement correction on the sheet S with the double-sided oblique movement correcting unit 80.

On the other hand, in a case that the basis weight of the sheet S is equal to or less than the predetermined value (YES in S104), it determines whether the humidity is equal to or more than the predetermined value as a third threshold value (for example, the humidity is 60% in a case that the temperature is 25 degrees) (S105). In a case that the humidity is not equal to or more than the predetermined value (NO in S105), it proceeds directly to step S108 and printing on the second surface (back surface) of the sheet S is performed.

On the other hand, in a case that the humidity is equal to or more than the predetermined value (YES in S105), it determines whether the amount of curl correcting invasion (that is, pressing force) of the double-sided decurling unit 70 is equal to or more than the predetermined value (for example, from "4" to "6" for thin paper, from "1" to "5" for ultrathin paper) as a first threshold value (S106). In a case that the invading amount is not equal to or more than the predetermined value (NO in S106), it proceeds directly to step S108 and printing on the second surface (back surface) of the sheet S is performed. Incidentally, the amount of curl correcting invasion of the double-sided decurling unit 70 is determined by using a value which is obtained with reference to the curl correction table which is described above, even before execution of decurling by of the double-sided decurling unit 70.

And in a case that the invading amount is equal to or more than the predetermined value (YES in S106), the oblique movement correction is executed in the double-sided oblique movement correcting unit 80 before correcting the curl (decurling) by the double-sided decurling unit 70. That is, when the conditions in steps S104 to S106 above are met, skew correction is executed in the double-sided oblique movement correcting unit 80, followed by curl correcting in the double-sided decurling unit 70 (S107). And it proceeds to step S108 and printing on the second surface (back surface) of the sheet S is performed.

After that, similarly, it proceeds to step S110 and it determines whether the subsequent paper (next sheet to print) is existed or not. In the case that the subsequent paper is existed (NO in S109), it returns to step S102 and executes printing on the first surface of the next sheet S, and in the case that the subsequent paper is not existed (YES in S109), it terminates the print job (S110) and terminates the control.

As described above, in the embodiment, in a case that the sheet S is thin paper or ultrathin paper in which wrinkle is easily generated, and in a case that the humidity is high and the amount of curl correcting invasion is large, the oblique movement correction is executed in the double-sided oblique movement correcting unit 80 before performing curl correction by the double-sided decurling unit 70. In this way, it is possible to prevent the wrinkle from generating in a case of performing curl correction by the double-sided decurling unit 70.

Incidentally, in the embodiment, a case of executing the oblique movement correction in the double-sided oblique movement correcting unit 80, when it is printed on both sides on thin paper or ultrathin paper particularly in which the wrinkle is easily generated, is described. However, even for plain paper, thick paper, etc. which are less likely to generate the wrinkle, the oblique movement correction may be executed in the double-sided oblique movement correcting unit 80. However, in a case of plain paper, thick paper, etc. it is necessary to be careful that an operational noise may increase due to loop formation during the oblique movement correction, a roller slip mark may occur during loop formation, or a friction mark with a guide, etc. may occur during loop formation.

Second Embodiment

Subsequently, a second embodiment, in which the first embodiment which is described above is partly modified, will be described with reference to FIG. 16. FIG. 16 is a schematic view showing a printer according to a second embodiment. Incidentally, in the description of the second embodiment, the same reference numerals will be used for parts which are similar to those in the first embodiment which is described above, and those description will be omitted.

In the first embodiment which is described above, it is described that the double-sided oblique movement correcting unit 80 and the double-sided decurling unit 70 are disposed in parallel immediately upstream of the first double-sided conveying unit 60 of the post-reverse path Pa5 in the casing 1*a* with respect to the conveying direction (see FIG. 1). However, when it is possible to suppress the oblique movement of the sheet which is conveyed to the double-sided decurling unit 70, it is not always necessary to dispose the double-sided oblique movement correcting unit 80 immediately upstream of the double-sided decurling unit 70. It may be disposed after image forming on the first surface, that is, in the conveying path which is downstream of the fixing unit 100, and in the conveying path which is upstream of the double-sided decurling unit 70.

As an area in which the oblique movement of the sheet S is easily occurred, one of examples is an area in which an unfixed toner image is formed on the sheet S and it is not possible to nip the sheet S by a roller or a guide, such as an area from the secondary transfer nip T2 to the fixing unit 100. Further, as the area in which the oblique movement of the sheet S is easily occurred, other examples are an area in which a nip pressure is high such as the fixing unit 100, an area in which the number of nip pieces of rollers is fewer such as the reversing conveying unit 130, etc. It is effective that the double-sided oblique movement correcting unit 80 is provided on a downstream side of those areas in which the oblique movement is easily occurred.

Therefore, in the second embodiment, as shown in FIG. 16, the double-sided oblique movement correcting unit 80 is disposed immediately downstream of the reversing conveying unit 130 with respect to the conveying direction. Specifically, in the casing 1*b*, the double-sided oblique movement correcting unit 80 is disposed between the reversing conveying unit 130 and the second double-sided conveying unit 140 with respect to the conveying direction. Even when it is disposed like this, it is possible to convey the sheet S whose oblique movement is corrected in the double-sided oblique movement correcting unit 80 to the double-sided decurling unit 70, and it is possible to correct the curl with high accuracy in the double-sided decurling unit 70 and prevent the wrinkle from generating on the sheet.

Third Embodiment

Subsequently, a third embodiment, in which the second embodiment which is described above is partly modified, will be described with reference to FIG. 17. FIG. 17 is a schematic view showing a printer according to a third embodiment. Incidentally, in the description of the third embodiment, the same reference numerals will be used for parts which are similar to those in the first embodiment and the second embodiment which are described above, and those description will be omitted.

In the second embodiment which is described above, it is described that the double-sided oblique movement correcting unit 80 is disposed immediately downstream of the reversing conveying unit 130 in the casing 1*b* and the double-sided decurling unit 70 is disposed immediately upstream of the first double-sided conveying unit 60 with respect to the conveying direction in the casing 1*a* (see FIG. 16). However, it is not always necessary that the double-sided decurling unit 70 is disposed immediately upstream of the first double-sided conveying unit 60 with respect to the conveying direction, that is, it may be disposed anywhere after image forming of the first surface of the sheet. In short, it may be provided on the reconveying path PR which is downstream of the fixing unit 100 and on the conveying path which is upstream of the registration unit 30 (feeding path Pa1) in which the sheet S of the second surface is reconveyed.

Therefore, in the third embodiment, as shown in FIG. 17, the double-sided oblique movement correcting unit 80 and the double-sided decurling unit 70 are disposed immediately downstream of the reversing conveying unit 130 with respect to the conveying direction. Specifically, in the casing 1*b*, the double-sided oblique movement correcting unit 80 and the double-sided decurling unit 70 are disposed between the reversing conveying unit 130 and the second double-sided conveying unit 140 with respect to the conveying direction. Even when it is disposed like this, it is possible to convey the sheet S whose oblique movement is corrected in the double-sided oblique movement correcting unit 80 to the double-sided decurling unit 70, and it is possible to correct the curl with high accuracy in the double-sided decurling unit 70 and prevent the wrinkle from generating on the sheet. Further, by disposing both the double-sided oblique movement correcting unit 80 and the double-sided decurling unit 70 in the same casing 1*b*, it is possible to reduce the chance that the sheet S, whose oblique movement has been corrected in the double-sided oblique movement correcting unit 80, obliquely moves again and is conveyed to the double-sided decurling unit 70.

Possibility of Other Embodiments

Incidentally, in from the first embodiment through the third embodiment which are described above, it is described that the curl correcting rollers 71*a* and 72*a*, and the driven correcting roller 72*b* and 72*b* in the double-sided decurling unit 70 are configured of the small diameter hard rollers and the large diameter soft rollers. However, the present invention is not limited to this, for example, it may be a configuration which combines a small diameter hard roller and an endless belt, and it may be any configuration as far as it is possible to form a curved nip which corrects the curl of the sheet S. Even with any configuration, the wrinkle may be generated in the curved nip due to the small difference in the velocity vectors which is described above, so it is effective to convey the sheet S to the double-sided decurling unit 70 after correcting the oblique movement by the double-sided oblique movement correcting unit 80.

Further, in from the first embodiment through the third embodiment, a configuration, in which the double-sided oblique movement correcting unit 80 corrects the oblique movement by abutting the leading end of the sheet S against the nip portion of the double-sided registration roller pair 82 and aligning it, is described. However, it is not limited to this configuration, for example, it may also be a configuration in which the oblique movement is corrected by abutting a side end of the sheet against an abutting plate which is disposed on one end of the width direction which is perpendicular to the conveying direction, or a configuration in which the oblique movement is corrected by abutting the leading end of the sheet against an abutting member such as a shutter. Furthermore, it may also be a configuration in which the oblique movement is corrected by a rotational speed difference among a plurality of rollers which are independently driven. That is, it may be any configuration as far as it is possible to correct the oblique movement of the sheet.

Further, in from the first embodiment through the third embodiment, it is described that the printer 1 is configured of two casings, however, it may be configured of one casing or three or more casings. Further, the printer 1 is not limited to one device, however, it may also be an image forming system which is configured as a plurality of devices. For example, the image forming system which is provided with a print module as an image forming apparatus and a determination module which reverses the sheet on which the image is formed on the first surface in the print module and reconvey to the print module, etc. are considered.

Further, in from the first embodiment through the third embodiment, it is described that the printer 1 is provided with the cooling unit 110, however, it is not limited to this, and it may be a configuration in which it is not provided with the cooling unit 110 and the sheet S which is heated by the fixing unit 100 is cooled naturally, for example.

Further, in from the first embodiment through the third embodiment, it is described that a photosensitive member is exposed with a laser and the toner image is formed in the image forming unit 90, that is, the printer 1 is a laser beam printer. However, it is not limited to this, however, it may be a printer such as an inkjet printer, for example. In the case, the fixing portion may be a drying unit which fixes an image by drying an ink.

According to the present disclosure, it is possible to prevent the wrinkle from generating when correcting the curl of the sheet in the curl correcting portion.

While the present disclosure has been described with reference to embodiments, it is to be understood that the present disclosure is not limited to the disclosed embodiments. The scope of the following claims is to be accorded the broadest interpretation so as to encompass all such modifications and equivalent structures and functions.

This application claims the benefit of Japanese Patent Application No. 2024-163546 filed on Sep. 20, 2024, which is hereby incorporated by reference herein in its entirety.

What is claimed is:

1. An image forming apparatus comprising:

an image forming portion configured to form an image on a sheet;

a discharge conveying path configured to convey the sheet on which the image is formed by the image forming portion toward a discharging portion to which the sheet is discharged;

a reconveying path branched from the discharge conveying path and configured to reconvey the sheet of which the image is formed on a first surface by the image forming portion to the image forming portion;

a curl correcting portion disposed in the reconveying path, including a first rotatable member and a second rotatable member configured to form a first nip portion with the first rotatable member, and configured to correct a curl of the sheet by conveying the sheet while the first rotatable member deforms the second rotatable member in the first nip portion; and a first oblique movement correcting portion disposed in the reconveying path and upstream of the curl correcting portion with respect to a sheet conveying direction and configured to be capable of performing an oblique movement correction of the sheet.

2. The image forming apparatus according to claim 1, further comprising a reversing portion disposed in the reconveying path and configured to reverse the sheet conveying direction of the sheet of which the image is formed on a first surface by the image forming portion, wherein the reconveying path includes a post-reverse path configured to guide the sheet of which the sheet conveying direction is reversed by the reversing portion to the image forming portion, and wherein the first oblique movement correcting portion is disposed in the post-reverse path.

3. The image forming apparatus according to claim 2, further comprising:

a feeding portion configured to feed the sheet to the image forming portion;

a feeding path configured to guide the sheet fed from the feeding portion to the image forming portion; and a second oblique movement correcting portion disposed in the feeding path and configured to be capable of performing an oblique movement correction of the sheet fed from the feeding portion, wherein the reconveying path guides the sheet to the image forming portion by being merged with the feeding path.

4. The image forming apparatus according to claim 3, further comprising:

a first casing in which the feeding portion is disposed; and a second casing in which the reversing portion is disposed, wherein the curl correcting portion is disposed in the first casing.

5. The image forming apparatus according to claim 4, wherein the first oblique movement correcting portion is disposed in the first casing.

6. The image forming apparatus according to claim 4, wherein the first oblique movement correcting portion is disposed in the second casing.

7. The image forming apparatus according to claim 3, further comprising:

a first casing in which the feeding portion is disposed; and a second casing in which the reversing portion is disposed, wherein the curl correcting portion and the first oblique movement correcting portion are disposed in the second casing.

8. The image forming apparatus according to claim 1, wherein the image forming apparatus includes a transfer portion configured to transfer the image on the sheet, and a fixing portion disposed downstream of the transfer portion in the sheet conveying direction and configured to fix the image transferred to the sheet onto the sheet.

9. The image forming apparatus according to claim 8, wherein the image forming apparatus includes a cooling portion disposed downstream of the fixing portion in the sheet conveying direction and configured to cool the sheet on which the image is fixed.

10. The image forming apparatus according to claim 1, wherein the second rotatable member contacts the first surface of the sheet and the first rotatable member contacts a second surface of the sheet opposite to the first surface, and wherein the curl correcting portion includes a third rotatable member configured to contact the first surface of the sheet, and a fourth rotatable member configured to contact the second surface of the sheet and form a second nip portion with the third rotatable member, and the curl of the sheet is corrected by the fourth rotatable member being deformed by the third rotatable member.

11. The image forming apparatus according to claim 10, wherein a hardness of the second rotatable member is lower than a hardness of the first rotatable member, and wherein a hardness of the fourth rotatable member is lower than a hardness of the third rotatable member.

12. The image forming apparatus according to claim 10, further comprising a control portion configured to control the first oblique movement correcting portion and the curl correcting portion, wherein the curl correcting portion includes a first press adjusting portion configured to be capable of adjusting a pressing force to press one of the first rotatable member and the second rotatable member toward the other of the first rotatable member and the second rotatable member, and a second press adjusting portion configured to be capable of adjusting a pressing force to press one of the third rotatable member and the fourth rotatable member toward the other of the third rotatable member and the fourth rotatable member, and wherein the control portion controls the first press adjusting portion and the second press adjusting portion.

13. The image forming apparatus according to claim 12, wherein the pressing force of the first press adjusting portion is larger than the pressing force of the second press adjusting portion in a case in which a density of the image is a first density, and wherein the pressing force of the second press adjusting portion is larger than the pressing force of the first press adjusting portion in a case in which the density of the image is a second density larger than the first density.

14. The image forming apparatus according to claim 12, wherein the control portion causes the first oblique movement correcting portion not to perform an oblique movement correction in a case in which the pressing force adjusted in the first press adjusting portion or the second press adjusting portion is lower than a first threshold value.

15. The image forming apparatus according to claim 1, further comprising a control portion configured to control the first oblique movement correcting portion, wherein the control portion causes the first oblique movement correcting portion not to perform an oblique movement correction in a case in which a basis weight of the sheet is higher than a second threshold value.

16. The image forming apparatus according to claim 1, further comprising a control portion configured to control the first oblique movement correcting portion, wherein the control portion causes the first oblique movement correcting portion not to perform an oblique movement correction in a case in which a humidity is lower than a third threshold value.

17. The image forming apparatus according to claim 1, wherein in a sheet widthwise direction perpendicular to the sheet conveying direction, the first nip portion formed by the first rotatable member and the second rotatable member is longer than a length of a sheet having a maximum size, in the sheet widthwise direction, printable by the image forming apparatus.

18. The image forming apparatus according to claim 1, further comprising a registration roller pair configured to convey the sheet by nipping the sheet after correcting an oblique of the sheet by contacting a leading end of the sheet in the sheet conveying direction, wherein in the sheet conveying direction, the registration roller pair and the first rotatable member are adjacent to each other.

19. The image forming apparatus according to claim 1, further comprising a press adjusting portion configured to be capable of adjusting a pressing force to press one of the first rotatable member and the second rotatable member toward the other of the first rotatable member and the second rotatable member, wherein the press adjusting portion adjusts the pressing force to a first pressing force in a case in which a thickness of the sheet is a first thickness, and to a second pressing force in a case in which the thickness of the sheet is a second thickness smaller than the first thickness, and wherein an absolute value of the second pressing force is larger than an absolute value of the first pressing force.

20. The image forming apparatus according to claim 1, further comprising a press adjusting portion configured to be capable of adjusting a pressing force to press one of the first rotatable member and the second rotatable member toward the other of the first rotatable member and the second rotatable member, wherein the press adjusting portion adjusts the pressing force to a first pressing force in a case in which a humidity is a first humidity, and to a second pressing force in a case in which the humidity is a second humidity larger than the first humidity, wherein an absolute value of the second pressing force is larger than an absolute value of the first pressing force.

* * * * *